United States Patent Office 3,250,767
Patented May 10, 1966

3,250,767
1,1,2 TRIARYL ETHANES, ETHENES AND ETHANOLS
William Laszlo Bencze, New Providence, N.J., assignor to Ciba Corporation, New York, N.Y., a corporation of Delaware
No Drawing. Filed June 9, 1964, Ser. No. 373,820
25 Claims. (Cl. 260—240)

This is a continuation-in-part application of my application Serial No. 281,360, filed May 17, 1963, now abandoned which in turn is a continuation-in-part application of my application Serial No. 210,588, filed July 17, 1962, now abandoned.

The present invention concerns 1,1,2-triaryl-ethane compounds. More particularly, it relates to compounds having one of the following formulae

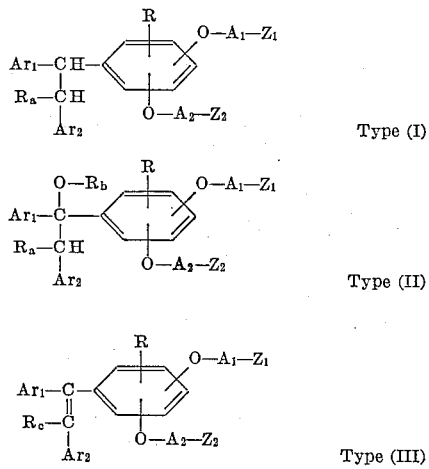

in which each of the groups $Ar_1$ and $Ar_2$ is carboxyclic aryl, each of the groups $Z_1$ and $Z_2$ stands for N,N-disubstituted amino, each of the groups $A_1$ and $A_2$ is lower alkylene separating $Z_1$ and $Z_2$, respectively, from oxygen by at least two carbon atoms, R is hydrogen, lower alkyl, halogeno, or a group of the formula —O—$A_3$—$Z_3$, in which $Z_3$ is an N,N-disubstituted amino group, and $A_3$ is lower alkylene separating $Z_3$ from oxygen by at least two carbon atoms, $R_a$ is hydrogen or lower alkyl, $R_b$ is hydrogen or an acyl radical, and $R_c$ is hydrogen, lower alkyl or halogeno, or salts thereof, as well as N-oxides thereof, salts of N-oxides thereof or quaternary ammonium compounds thereof. Also included within the scope of this invention is process for the preparation of such compounds.

A carbocyclic aryl radical representing $Ar_1$ or $Ar_2$ is more especially a monocyclic carbocyclic aryl radical, as well as a bicyclic carbocyclic aryl radical, particularly phenyl or substituted phenyl, as well as naphthyl, e.g. 1-naphthyl or 2-naphthyl, or substituted naphthyl. The substituted phenyl or substituted naphthyl radicals have one or more than one of the same or different substituents attached to any of the positions available for substitution; substituents are, for example, lower alkyl, e.g. methyl, ethyl, n-propyl, isopropyl, n-butyl and the like, etherified hydroxyl, especially lower alkoxy, e.g. methoxy, ethoxy, isopropyloxy, n-butyloxy and the like, as well as lower alkenyloxy, e.g. allyloxy, 2-butenyloxy and the like, lower alkylene-dioxy, e.g. methylenedioxy, 1,1-ethylenedioxy and the like, or esterified hydroxyl, particularly halogeno, e.g. fluoro, chloro, bromo and the like, as well as etherifier mercapto, particularly lower alkyl-mercapto, e.g. methylmercapto, ethylmercapto and the like, nitro, amino, primarily N,N-di-lower alkyl-amino, e.g. N,N-dimethylamino, N,N-diethylamino and the like, or halogeno-lower alkyl, e.g. chloromethyl, trifluoromethyl and the like. A substituted carbocyclic aryl radical is also a biphenylyl radical, particularly a 4-biphenylyl radical, in which a monocyclic carbocyclic aryl is substituted in the p-position by another monocyclic carbocyclic aryl group; in a biphenyl radical, one or both phenyl groups may be substituted by one or more than one of the same or of different substituents, such as those mentioned above, particularly lower alkyl, lower alkoxy, and/or halogeno, as well as lower alkyl-mercapto, nitro, N,N-di-lower alkyl-amino and/or halogeno-lower alkyl.

While the substituents of the formulae —O—$A_1$—$Z_1$, —O—$A_2$—$Z_2$ and/or —O—$A_3$—$Z_3$ may be different, they are usually identical, and represent O—A—Z, in which Z is N,N-disubstituted amino and A is lower alkylene separating Z from oxygen by at least one carbon atom.

N,N-disubstituted amino groups representing $Z_1$, $Z_2$ and/or $Z_3$, as well as Z, are, for example, amino groups having two individual substituents. These are represented above all by N,N-di-lower alkyl-amino, e.g. N,N-dimethylamino, N-ethyl-N-methylamino, N,N-diethylamino, N,N-dipropylamino, N,N-di-isopropylamino and the like, as well as N-cycloalkyl-N-lower alkyl-amino, in which cycloalkyl has from three to eight, preferably from five to seven, carbon atoms, e.g. N-cyclopentyl-N-methyl-amino, N-cyclohexyl-N-methyl-amino and the like, N-lower alkyl-N-phenyl-lower alkyl-amino, e.g. N-benzyl-N-methyl-amino, N-methyl-N - (2 - phenylethyl) - amino N-benzyl-N-ethyl-amino and the like, or any other equivalent N,N-disubstituted amino group. In an N,N-disubstituted amino group, the two substituents may also be taken together and form a heterocyclic ring-system with the aminonitrogen. N,N-disubstituted amino groups of this type may be represented by N,N-alkylene-imino, in which alkylene has preferably from four to six carbon atoms, primarily 1-pyrrolidino, 1-piperidino or 1-(1,6-hexylene)-imino, as well as 2-methyl-1-pyrrolidino, 2-methyl-1-piperidino, 3-methyl-1-piperidino, 4-methyl-1-piperidino, 3-hydroxyl-1-piperidino, 3-acetoxy-1-piperidino, 3-hydroxymethyl-1-piperidino and the like, by N,N-oxa-alkylene-imino or N,N-thia-alkylene-imino, in which alkylene has preferably four carbon atoms, e.g. 4-morphonilo, 4-thiamorpholino and the like or N,N-aza-alkylene-imino, in which alkylene has from four to six carbon atoms, such as 1-piperazino, or N,N-(N-substituted-aza-alkylene)-imino radicals, primarily N,N-(N-lower alkyl-aza-alkylene)-imino, for example, 4-lower alkyl-1-piperazino, e.g. 4-methyl-1-piperazino, 4-ethyl-1-piperazino and the like, as well as 1-(3-aza-3-methyl-1,6-hexylene)-imino, 1 - (4 - aza - 4-methyl - 1,7 - heptylene)-imino and the like, or other equivalent radicals, such as 4-(2-hydroxyethyl)-1-piperazino, 4-(2-acetoxyethyl)-1-piperazino and the like.

The lower alkylene portions $A_1$, $A_2$ and/or $A_3$, as well as A, which separate the N,N-disubstituted amino groups $Z_1$, $Z_2$ and/or $Z_3$, respectively, as well as Z, from oxygen by at least two carbon atoms, have preferably from two to three carbon atoms and are represented by 1,2-ethylene, 1-methyl-1,2-ethylene, 2-methyl-1,2-ethylene or 1,3-propylene.

The group R in the above formula represents primarily hydrogen or N,N-disubstituted amino-lower alkyl-oxy of the formula —O—$A_3$—$Z_3$, but may stand for lower alkyl, e.g. methyl, ethyl, n-propyl, isopropyl and the like, or halogeno, e.g. fluoro, chloro, bromo and the like.

The group $R_a$ is primarily hydrogen, but may also be lower alkyl, e.g. methyl, ethyl, n-propyl, ispropyl and the like.

The group $R_b$ is primarily hydrogen. It may also represent the acyl radical, especially the acyl radical of an organic carboxylic acid, such as an aliphatic carboxylic acid, especially a lower alkanoic acid, e.g. acetic, propionic, pivalic, α,α-dimethyl-butyric acid and the like, as well as a substituted lower alkanoic acid, such as a lower alkoxy-lower alkanoic acid, e.g. methoxy-acetic, trimethoxy-pivalic acid and the like, a lower alkoxy-carbonic acid, e.g. methoxy-carbonic, ethoxy-carbonic and the like, or halogeno-lower alkanoic acid, e.g. chloroacetic, dichloroacetic, bromoacetic acid and the like, or any other suitable organic carboxylic acid, e.g. benzoic, 3,4,5-trimethoxy-benzoic, nicotinic acid and the like.

The group $R_c$ in the above formula is hydrogen or halogeno, especially chloro, as well as bromo and the like, but may also stand for lower alkyl, particularly methyl, as well as ethyl, isopropyl and the like.

Salts of the compounds of this invention are particularly the acid addition salts, such as pharmaceutically acceptable, non-toxic acid addition salts with inorganic acids, e.g. hydrochloric, hydrobromic, sulfuric, phosphoric acids and the like, or organic acids, for example, organic carboxylic acids, e.g. acetic, glycolic, succinic, lactic, maleic, hydroxymaleic, fumaric, malic, tartaric, citric, glucuronic, benzoic, salicyclic, pamoic, nicotinic, isonicotinic acid and the like, or organic sulfonic acids, e.g. methane sulfonic, ethane sulfonic, 2-hydroxyethane sulfonic, ethane, 1,2-disulfonic, p-toluene sulfonic, naphthalene 2-sulfonic acid and the like. Other acid addition salts are also included within the scope of this invention; such salts may be used, for example, as intermediates in the purification of the free compounds or in the preparation of other, such as pharmaceutically acceptable, acid addition salts, as well as for identification and characterization purposes. Salts serving the latter are, for example, those with certain inorganic acids, e.g. perchloric acid, with acidic organic nitro compounds, e.g. picric, picrolonic, flavianic acid and the like, or with metal complex acids, e.g. phosphotungstic, phosphomolybdic, chloroplatinic, Reinecke acid and the like.

Also included are the N-oxides of the compounds of this invention, as well as the acid addition salts, particularly the pharmaceutically acceptable acid addition salts, of such N-oxides, such as those with the acids mentioned before.

Quaternary ammonium derivatives of the compounds of this invention are those formed with reactive esters of alcohols, particularly lower alkanols or phenyl-lower alkanols, and strong inorganic or organic acids. Such esters are, for example, lower alkyl halides, e.g. methyl, ethyl, propyl or isopropyl chloride, bromide or iodide and the like, phenyl-lower alkyl halides, e.g. benzyl, 1-phenylethyl or 2-phenylethyl chloride or bromide and the like, lower alkyl lower alkane sulfonates, e.g. methyl or ethyl methane or ethane sulfonate and the like, lower alkyl hydroxy-lower alkane sulfonates, e.g. methyl 2-hydroxyethane sulfonate and the like, di-lower alkyl-sulfates, e.g. dimethyl sulfate, diethyl sulfate and the like. Also included as quaternary ammonium compounds are the quaternary ammonium hydroxides, and quaternary ammonium salts with other inorganic acids, or particularly those with organic carboxylic or other organic sulfonic acids, such as those described before.

The compounds of this invention may be in the form of mixtures of isomeric compounds, such as mixtures of cis- isomer and trans-isomer, or racemates, or of single isomers, e.g. the cis-isomers, the trans-isomers, the optical antipodes and the like.

The compounds of this invention have anti-parasite, particularly taeniacidal (anti-tapeworm), properties, and are, therefore, useful anti-parasitic compounds, particularly as taeniacides in the treatment of tapeworm infections, caused, for example, by *Hymenolepas nana, Dypilidium canium, Taniae pisiformis, Moniezia benedeni* and the like.

Compounds of this invention also cause a reduction of the cholesterol level in the blood of hypercholesterolemic animals. Such compounds are, therefore, useful in lowering the level of cholesterol in the body.

Compounds of this invention also exhibit anti-estrongenic effects, and can, therefore, be used, for example, as anti-fertility agents to prevent the fertilization of the ovum.

A preferred group of the compounds are those having the following formulae

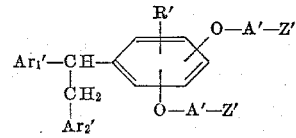

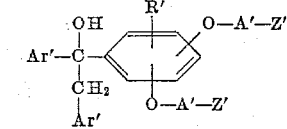

and

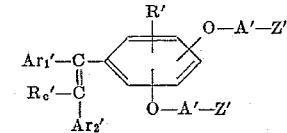

in which each of the groups $Ar_1'$ and $Ar_2'$ is phenyl, (lower alkyl)-phenyl, (lower alkoxy)-phenyl, (halogeno)-phenyl, or (halogeno-lower alkyl)-phenyl, as well as biphenylyl, (lower alkyl)-biphenylyl, (lower alkoxy)-biphenylyl, (halogeno)-biphenylyl or (halogeno-lower alkyl)-biphenyl, the group $Z'$ is N,N-di-lower alkyl-amino or N,N-alkylene-imino, in which alkylene has from four to six carbon atoms, $A'$ is lower alkylene having from two to three carbon atoms and separating $Z'$ from oxygen by at least two carbon atoms, $R'$ is hydrogen or the group of the formula $—O—A'—Z'$, in which $Z'$ and $A'$ have the previously-given meaning, and $R_c'$ is hydrogen or halogeno, particularly chloro, or the acid addition salts, particularly the pharmaceutically acceptable, non-toxic acid addition salts, thereof.

The compounds of this invention are useful in the form of compositions suitable for enteral, e.g. oral, or parenteral use; essentially, they comprise a pharmacologically effective amount of one of the new compounds of this invention in admixture with a pharmaceutically acceptable, organic or inorganic, solid or liquid carrier, which usually represents the major portion by weight of such compositions. These preparations are in solid form, for example, as capsules, tablets, dragees and the like, or in liquid form, for example, as solutions, suspensions and the like. Suitable carrier materials, are, for example, starches, e.g. corn starch, wheat starch, rice starch and the like, sugars, e.g. lactose, glucose, sucrose and the like, stearic acid or salts thereof, e.g. magnesium stearate, calcium stearate and the like, water, benzyl alcohol, stearyl alcohol, talc, gums, acacia, tragacanth, sodium lauryl sulfate, polyalkylene glycols, propylene glycol and the like. The quantity and the nature of the carrier ingredients can vary widely and depend, inter alia, upon the desired physical appearance or size of the composition, method of manufacture and the like. Encapsulation may be effected by using, if desired, the same excipients as those for tablets. If necessary, the compositions may contain other auxiliary substances, such as preserving, stabilizing, wetting, emulsifying agents and the like, salts for varying the osmotic pressure, buffers, etc. They may also contain, in combination, other pharmacologically useful substances. The compounding of the formulations is generally carried out in the manner normally employed in the art, i.e. by manufacturing a mixture, a granulate and the like. Any compatible color, approved and certified under the provisions of the Federal Food, Drug and Cosmetic Law may be used for aesthetic purposes or as a means of identification.

The compounds of this invention are prepared according to known methods, which depend on the type of compound to be prepared. Thus, the compounds of Type I are obtained, for example, by converting in a compound of the formula

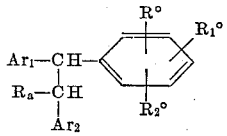

in which $Ar_1$, $Ar_2$ and $R_a$ have the previously-given meaning, $R_1°$ is the group of the formula $—O—A_1—Z_1$ or a group capable of being converted into the latter, $R_2°$ is the group of the formula $—O—A_2—Z_2$ or a group capable of being converted into the latter, and $R°$ is hydrogen, lower alkyl, halogeno, the group of the formula $—O—A_3—Z_3$ or a group capable of being converted into the latter, with the proviso, that at least one of the groups $R_1°$, $R_2°$ and $R°$ is a group capable of being converted into a group of the formula $—O—A_1—Z_1$, $—O—A_2—Z_2$ and $—O—A_3—Z_3$, respectively, or a salt thereof, any of the groups $R_1°$, $R_2°$ and/or $R°$ capable of being so converted into a group of the formula $—O—A_1—Z_1$, $—O—A_2—Z_2$ and $—O—A_3—Z_3$, respectively, and, if desired, converting a resulting salt into the free compound or into another salt, and/or, if desired, converting a resulting compound into an N-oxide or a quaternary ammonium compound thereof, and/or, if desired, converting a resulting compound or an N-oxide thereof into a salt thereof, and/or, if desired, separating a mixture of isomers into the single isomers.

In the above starting materials the groups $R_1°$ and $R_2°$, as well as $R°$, whenever representing a group capable of being converted into N,N-disubstituted amino-lower alkyl-oxy, are usually identical substituents; preferably, they are converted into the group of the formula $—O—A—Z$, in which Z and A have the previously-given meaning.

A particularly suitable group capable of being converted into N,N-disubstituted amino-lower alkyl-oxy is hydroxyl; its conversion into N,N-disubstituted amino-lower alkyl-oxy is carried out according to known procedures. Usually, the starting material substituted by hydroxyl representing the group capable of being converted into N,N-disubstituted amino-lower alkyl-oxy, or preferably a salt thereof, is reacted with a reactive ester of an N,N-disubstituted amino-lower alkanol, in which the N,N-disubstituted amino group is separated from hydroxyl by at least two carbon atoms. The latter is above all a hydroxyl group esterified with a strong mineral acid, such as a hydrohalic acid, e.g. hydrochloric, hydrobromic acid and the like, and is primarily halogeno, e.g. chloro, bromo and the like. It may also be a hydroxyl group esterified with a strong organic sulfonic acid, such as a lower alkane sulfonic acid, e.g. methane sulfonic, ethane sulfonic acid and the like, or a monocyclic carbocyclic aryl-sulfonic acid, e.g. p-toluene sulfonic acid and the like, and may, therefore, also stand for lower alkyl-sulfonyloxy, e.g. methylsulfonyloxy, ethylsulfonyloxy and the like, or monocyclic carbocyclic arylsulfonyloxy, e.g. p-tolylsulfonyloxy and the like. The preferred reactive esters of an N,N-disubstituted amino-lower alkanol are the N,N-disubstituted amino-lower alkyl-halides, especially chlorides, in which the N,N-disubstituted amino group is separated from halogeno by at least two carbon atoms.

As noted above, the starting material is preferably used in the form of a salt thereof. Such salt, for example, a metal salt, particularly an alkali metal salt, e.g. lithium, sodium, potassium and the like, as well as an alkaline earth metal salt, or any other suitable salt, is formed, for example, by treatment of the starting material with a metal salt-forming reagent, such as an alkali metal hydride or an alkali metal amide, e.g. lithium hydride, sodium hydride, sodium amide, potassium amide and the like, or any other suitable reagent, such as an alkali metal lower alkoxide or alkaline earth metal lower alkoxide, e.g. lithium, sodium, potassium or barium methoxide, ethoxide or tertiary butoxide and the like, or an alkali metal compound of a hydrocarbon, e.g. butyl lithium, phenyl lithium, phenyl sodium and the like. The preparation of the salt is usually carried out in the presence of an inert solvent, e.g. hexane, benzene, toluene, xylene, di-ethyl ether, p-dioxane, tetrahydrofuran, diethyleneglycol dimethyl ether, N,N-dimethylformamide and the like, or any other suitable solvent, such as a lower alkanol, e.g. methanol, ethanol and the like, or solvent mixture, if necessary, while cooling or at an elevated temperature, and/or in the atmosphere of an inert gas.

The reaction of the starting material, particularly a metal compound thereof, with the reactive ester of an N,N-disubstituted amino-lower alkanol is carried out in the presence of a suitable diluent, for example, in the solvent or solvent mixture used for the preparation of a metal compound, if necessary, while cooling or at an elevated temperature, and/or, in the atmosphere of an inert gas, e.g. nitrogen. Formation of the metal compound of the starting material may also be achieved in situ; for example, the free starting material and the reactive ester of the N,N-disubstituted amino-lower alkanol may be reacted in the presence of a salt-forming reagent, for example, an alkali metal carbonate or an alkaline earth metal carbonate.

Conversion of hydroxyl into N,N-disubstituted amino-lower alkyl-oxy may also be achieved by treating the starting material substituted by hydroxy representing the group capable of being converted into N,N-disubstituted amino-lower alkyl-oxy, with an N,N-disubstituted amino-lower alkanol, in which the N,N-disubstituted amino group is separated from hydroxyl by at least two carbon atoms, in the presence of a disubstituted carbonate. The latter is, for example, a di-aryl carbonate, e.g. diphenyl carbonate and the like, or, more particularly, a di-lower alkyl carbonate, e.g. dimethyl carbonate, ethyl methyl carbonate, diethyl carbonate, dibutyl carbonate and the like. The reaction is carried out at an elevated temperature, for example, between about 100° and about 210°, preferably between about 180° and about 200°, and, if desired, in the presence of a transesterification catalyst enhancing the rate of the reaction, such as sodium, potassium, sodium carbonate, potassium carbonate, sodium aluminate and the like, a metal lower alkoxide, e.g. sodium ethoxide, titanium butoxide and the like, or any other analogous reagent. The reaction is usually performed in the absence of an additional solvent, an excess of the disubstituted carbonate serving as the diluent, but may also be carried out in the presence of a further solvent or solvent mixture, if necessary, in a closed vessel and/or in the atmosphere of an inert gas, e.g. nitrogen and the like.

Another group capable of being converted into N,N-disubstituted amino-lower alkyloxy is halogeno-carbonyloxy or etherified hydroxy-carbonyloxy. Etherified hydroxyl is particularly lower alkoxy, e.g. methoxy, ethoxy, n-butyloxy and the like, as well as phenyloxy or any other analogous etherified hydroxyl group, whereas halogeno is particularly chloro, as well as bromo and the like. Upon reacting a starting material substituted by etherified hydroxyl-carbonyloxy or halogeno-carbonyloxy representing the group capable of being converted into N,N-disubstituted amino-lower alkoxy-oxy, with an N,N-disubstituted amino-lower alkanol, in which N,N-disubstituted amino group is separated from hydroxyl by at least two carbon atoms, the desired compound can be formed. The reaction is carried out under the previously-described conditions, i.e. at an elevated temperature, preferably at between 180° and 200°, and, if desired, in the presence of a transesterification reagent, such as one of those previously-described; the reaction is preferably performed in the absence of a diluent, but may also be carried out in the presence of a solvent or solvent mixture, if necessary, in the atmosphere of an inert gas, e.g. nitrogen.

A further group capable of being converted into N,N-disubstituted amino-lower alkyl-oxy is also a reactive esterified hydroxy-lower alkyl-oxy group, in which the reactive esterified hydroxyl group is separated from the oxy group by at least two carbon atoms, and the reactive esterified hydroxy group is primarily halogeno, particularly chloro, but may also be a suitable organic sulfonyloxy group, such as one of those mentioned above. The starting material substituted by reactive esterified hydroxy-lower alkyl-oxy representing the group capable of being converted into N,N-disubstituted amino-lower alkyl-oxy is reacted with an N,N-disubstituted amine to yield the desired compound. The reaction is preferably carried out in such manner, that an excess of the amine or of any other suitable acid-neutralizing agent, e.g. potassium carbonate and the like, is present to neutralize the generated acid. If desired, the reaction mixture is diluted with a suitable inert solvent or solvent mixture; if necessary, the reaction is carried out while cooling or at an elevated temperature, and/or in the atmosphere of an inert gas, e.g. nitrogen and/or in a closed vessel.

The starting materials used in the above procedure are prepared according to known methods. Thus, they are obtained by reacting a compound of the formula

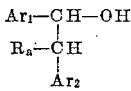

in which $Ar_1$, $Ar_2$ and $R_a$ have the previously-given meaning, and which is prepared by reduction, for example, with a light metal hydride, e.g. sodium borohydride and the like, of the corresponding ketone compound described below, with a compound of the formula

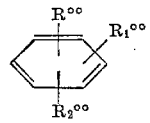

in which each of the groups $R_1^{\circ\circ}$, $R_2^{\circ\circ}$ and $R^{\circ\circ}$ have the same meaning as $R_1^{\circ}$, $R_2^{\circ}$ and $R^{\circ}$, respectively, but may also represent substituents capable of being converted into hydroxyl, particularly etherified hydroxyl groups, e.g. methoxy, ethoxy, benzyloxy and the like, with the proviso, that at least one of the groups $R_1^{\circ\circ}$, $R_2^{\circ\circ}$ and $R^{\circ\circ}$ is a group capable of being converted into a group of the formula $-O-A_1-Z_1$, $-O-A_2-Z_2$ and $-O-A_3-Z_3$, respectively, or into hydroxyl (whereby $R_1^{\circ\circ}$, $R_2^{\circ\circ}$ and $R^{\circ\circ}$, whenever representing groups capable of being converted into $-O-A_1-Z_1$, $-O-A_2-Z_2$ and $-O-A_3-Z_3$, respectively, are primarily hydroxyl), in the presence of a Lewis acid-type condensing reagent, e.g. aluminum chloride, stannic chloride, sulfuric acid and the like. If necessary, in a resulting compound any group capable of being so converted, is converted into hydroxyl, for example, by acid hydrolysis of an esterified hydroxyl group (e.g. treatment with hydrobromic acid, hydriodic acid, pyridine hydrochloride and the like), or by hydrogenolysis of a benzyloxy group (e.g. treatment with hydrogen in the presence of a suitable catalyst). Any hydroxyl group in a resulting compound may be converted into any of the other groups capable of being converted into N,N-disubstituted amino-lower alkyl-oxy, for example, by known esterification into halogeno-carbonyloxy or etherified hydroxy-carbonyloxy, e.g. formation of a salt, such as an alkali metal salt, and reaction of a resulting salt with a carbonic acid halide (to form the halogenocarbonyloxy or etherified hydroxy-carbonyloxy group), as well as into reactive esterified hydroxy-lower alkyl-oxy by known esterification, for example, with a reagent capable of forming the reactive esterified-lower alkyl-oxy group, if necessary, after the formation of a salt, such as an alkali metal salt (for example, with a lower alkylene halide, as well as with a lower alkylene oxide or a halogeno-lower alkanol and subsequent esterification of the hydroxyl group).

The compounds of Type I are also prepared, for example, by replacing in a compound of the formula

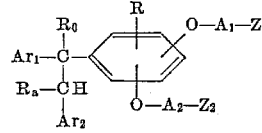

in which $Ar_1$, $Ar_2$, $R_a$, $Z_1$, $Z_2$, $A_1$, $A_2$, and R have the previously-given meaning, and $R_0$ is hydroxyl or esterified hydroxyl, or a salt thereof, the group $R_0$ by hydrogen, and, if desired, carrying out the optional steps.

A hydroxyl group representing $R_0$ is replaced according to known methods, for example, by treating the starting material or an acid addition salt thereof with hydrogen in the presence of a catalyst, e.g. a platinum catalyst (for example, in the presence of methanol), Raney nickel and the like, if necessary, at an increased pressure and/or at an elevated temperature. It may also be removed by chemical reduction, for example, by treatment with zinc in the presence of an acid, e.g. hydrochloric acid, acetic acid and the like, with a metal amalgam, e.g. sodium amalgam and the like, in the presence of a moist solvent, e.g. diethyl ether and the like, with a light metal hydride, e.g. lithium aluminum hydride in the presence of aluminum chloride and the like, or any other suitable method.

An esterified hydroxyl group representing $R_0$ is primarily halogeno (i.e. hydroxyl esterified with a hydrohalic acid), e.g. chloro, bromo and the like. It is removed either by catalytic hydrogenation or by chemical reduction, e.g. by treatment with zinc in the presence of an acid.

The starting material used in the above procedure is prepared according to the methods described below.

The compound of Type I are also obtained by converting in a compound of the formula

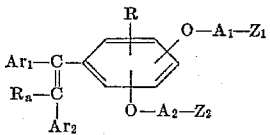

in which $Ar_1$, $Ar_2$, $R_a$, $Z_1$, $Z_2$, $A_1$, $A_2$ and R have the previously-given meaning, or a salt thereof, the aliphatic carbon-to-carbon double bond into a carbon-to-carbon single bond, and, if desired, carrying out the optional steps.

The removal of the carbon-to-carbon double bond is carried out according to methods known per se, for example, by treatment with an alkali metal, e.g. sodium and the like, in the presence of a lower alkanol, with metal amalgam in the presence of a hydrogen donor, e.g. sodium amalgam in the presence of moist diethyl ether, catalytically activated hydrogen, such as hydrogen in the presence of a platinum catalyst and the like, or any other suitable method, such as those mentioned above.

The starting materials used in the above reaction are prepared as described below.

The compounds of the Type II are obtained, for example, by reacting a ketone of the formula

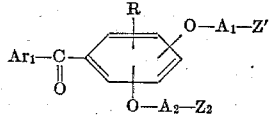

in which $Ar_1$, R, $A_1$, $A_2$, $Z_1$ and $Z_2$ have the previously-given meaning, with an organo-metallic reagent of the formula

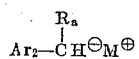

in which $Ar_2$ and $R_a$ have the previously-given meaning, and $M^{\oplus}$ is the positively charged ion of a metal of the IA-group of the Periodic System or the positively charged ion of the formula Hal—Met$^\oplus$, in which Met stands for a divalent metal of the IIA-group and the IIB-group of the Periodic System, and Hal is halogeno, and, if desired, converting in a resulting compound a free hydroxyl group into an acyloxy group, and/or, if desired, converting a resulting salt into the free compound or into another salt, and/or, if desired, converting a resulting compound into an N-oxide or a quaternary ammonium compound thereof, and/or, if desired, converting a resulting compound or an N-oxide thereof into a salt thereof, and/or, if desired, separating a mixture of isomers into the single isomers.

In the organo-metallic reagent of the above formula, the metal portion, represented by M$^\oplus$, is the positive ion of an alkali metal, particularly lithium, as well as sodium and the like, whereas the positive ion Hal—Met$^\oplus$, in which Met is a divalent metal of the IIA-group or the IIB-group, is more especially the ion of the formula Hal—Mg$^\oplus$, in which Hal is halogeno, e.g. chloro, bromo or iodo. Alkali metal derivatives are preferably those of compounds, in which Ar$_2$ is a carbocyclic aryl radical and R$_a$ represents lower a alkyl, whereas the other type of reagent, particularly the magnesium halide-type reagent (Grignard reagent), is preferably formed with all other compounds, particularly with those, in which Ar$_2$ stands for a carbocyclic aryl radical and R$_a$ is hydrogen.

Both types of reagents are used under similar conditions; usually, the alkali metal compound or the Grignard reagent is prepared separately and is then reacted with the ketone. A solvent used in the preparation of the organo-metallic reagent, for example, a di-lower alkyl ether, e.g. diethyl ether and the like, may be diluted or replaced by another solvent, for example, another ether, such as a monocyclic carbocyclic aryl lower alkyl ether, e.g. anisole and the like, a bis-monocyclic carbocyclic aryl ether, e.g. diphenyl ether and the like, a cyclic ether, e.g. tetrahydrofuran, p-dioxane and the like, an organic base, e.g. pyridine, N-methyl-morpholine and the like, a hydrocarbon, e.g. benzene, toluene, xylene, pentane, hexane and the like, or any other suitable inert solvent. The reaction may be carried out and completed while cooling, at room temperature or preferably at an elevated temperature; if necessary, the atmosphere of an inert gas, e.g. nitrogen, may be required, particularly when an alkali metal reagent is used.

The resulting reaction mixture is worked up according to known methods. For example, a complex resulting from the reaction of a ketone intermediate with a Grignard reagent may be broken by adding to the reaction mixture a weak acid, such as an aqueous solution of ammonium chloride and the like.

The starting materials used in the above procedure are known or, if new, may be prepared according to methods used for the preparation of the known analogs. Organo-metallic reagents of the previously-given formula, in which R$_a$ stands preferably for lower alkyl, and M$^\oplus$ represents the positive ion of an alkali metal, particularly lithium, may be prepared, for example, by treating a dilute solution of an ether compound of the formula

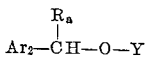

in which Y stands for lower alkyl, e.g. methyl and the like, carbocyclic aryl, e.g. phenyl and the like, or a carbocyclic aryl-lower alkyl radical, such as the radical of the formula

in which Ar$_2$ has the above-given meaning, and R$_a$ represents preferably lower alkyl, with an alkali metal, particularly lithium, in the presence of an inert solvent, particularly tetrahydrofuran, while maintaining a temperature below 0° C. and an atmosphere of nitrogen.

The ketone reagents are known or, if new, may be prepared according to known methods, for example, by acylating a phenol compound having at least two phenolic hydroxyl groups with an Ar$_2$-carboxylic acid halide, e.g. chloride and the like, in the presence of a suitable Lewis acid, e.g. aluminum chloride, zinc chloride, polyphosphoric acid and the like, according to the Friedel-Crafts method, or by reacting a phenol compound having at least two phenolic hydroxyl groups with an Ar$_2$-nitrile in the presence of hydrochloric acid and a Friedel-Crafts-type Lewis acid, e.g. aluminum chloride and the like, and hydrolyzing the resulting imine hydrochloride by heating it with water according to the Hoesch synthesis (Sporri et al., Organic Reactions, vol. V, p. 387, Wiley, 1949), or by rearranging an ester of a phenol by treatment with a Friedel-Crafts Lewis acid, e.g. aluminum chloride and the like, according to the Fries Rearrangement (Blatt, Organic Reactions, vol. I, p. 342, Wiley, 1942). In a resulting ketone any free phenolic hydroxyl groups may be converted into the desired N,N-disubstituted amino-alkyl-oxy groups required in the intermediates, for example, by forming an alkali metal, e.g. sodium and the like, compound of the phenolic ketone and reacting it with an N,N-disubstituted amino-alkyl halide, e.g. chloride and the like, according to known methods; details of such reaction are given above.

The compounds of Type II are also manufactured by reacting a ketone of the formula

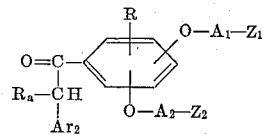

in which Ar$_2$, R$_a$, R, A$_1$, A$_2$, Z$_1$ and Z$_2$ have the previously-given meaning, with a reagent of the formula Ar$^\ominus$M$^\oplus$, in which Ar has the previously-given meaning, and M$^\oplus$ stands for the positive ion of alkali metals (Group IA of the Periodic System), or more particularly, the positive ion of the formula Met—Hal$^\oplus$, in which Met and Hal have the previously-given meaning, particularly the ion of the formula Hal—Mg$^\oplus$, and, if desired, carrying out the optional steps.

The above reaction is carried out as shown before, for example, according to the conditions of the Grignard reaction.

The organo-metallic reagents used in the above reaction are prepared according to known methods, such as those previously-described. The ketones used as starting materials in the above modification are known, or, if new, may be prepared according to known procedures. For example, they may be obtained by reacting a reagent of the formula

in which Ar$_2$ and R$_a$ have the above-given meaning, and M$^\oplus$ represents the positive ion of an alkali metal, e.g. sodium, or particularly lithium, with a lower alkyl ester of an acid of the formula

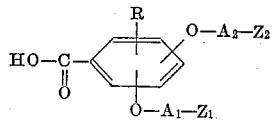

in which R, A$_1$, A$_2$, Z$_1$ and Z$_2$ have the previously-given meaning; the reaction is carried out under known conditions, which are in general analogous to those employed in the previously-described procedures.

A further modification of the procedure for manufacturing the Type II compounds of this invention comprises reacting a ketone of the formula

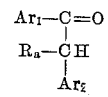

in which $Ar_1$, $Ar_2$ and $R_a$ have the previously-given meaning, with an organo-metallic reagent of the formula

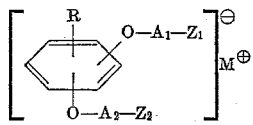

in which $R$, $A_1$, $A_2$, $Z_1$, $Z_2$ and $M^{\oplus}$ have the previously-given meaning, and, if desired, carrying out the optional steps.

In the above reaction the organo-metallic reagent is particularly a Grignard reagent, in which the positive ion stands primarily for that of the formula Hal—$Mg^{\oplus}$, in which Hal is, for example, chloro, bromo and the like. These Grignard reagents are prepared according to known methods, such as the "Method of Entrainment," described by Kharash and Reinmuth, Grignard Reactions of Nonmetallic Substances (Prentice Hall, 1954), or by using a cyclic reactor as disclosed by Lawesson, Act. Chem. Scand., vol. 12, p. 1 (1958). The ketones are known, or, if new, may be prepared according to methods used for the known types.

In the resulting Type II compounds, a free tertiary hydroxyl group may be converted into an esterified hydroxyl group, such as the corresponding acyloxy group, in which acyl is the acyl radical of an organic carboxylic acid. For example, a reactive functional derivative of an acid, particularly a carboxylic acid, and the tertiary alcohol compound may be contacted in the presence of a suitable organic base, e.g. N,N,N-trimethyl-amine, N,N,N-triethyl-amine, N - benzyl - N,N - dimethyl-amine, N,N-dimethyl-aniline, pyridine, collidine and the like; a liquid base may simultaneously serve as the diluent, or other solvents may be added, for example, benzene, toluene, pentane, hexane, diethyl ether and the like. A reactive functional derivative of a carboxylic acid is primarily an acid anhydride, e.g. acetic acid anhydride, propionic acid anhydride and the like, or an acid halide, particularly chloride, which reagents may be used in the absence or in the presence of a basic diluent, such as tertiary amine, or particularly a heterocyclic base, e.g. pyridine and the like.

The esterification of the tertiary hydroxy group in the Type II compounds may also be accomplished by treating the resulting triaryl-ethanol compound with the anhydride of a carboxylic acid in the presence of an acid instead of the base; for example, sulfuric acid or perchloric acid may be utilized as the acylating reagent, particularly when used in catalytic amounts. Other esterifying reagents capable of converting a tertiary hydroxyl group into an acyloxy group are, for example, ketene compounds, e.g. ketene or a substituted ketene; these reagents furnish acetyl or substituted acetyl radicals. The reaction with ketenes is performed in an inert solvent, such as an aromatic hydrocarbon, e.g. toluene and the like.

Other esters, such as those with hydrohalic acids, which are used as intermediates in one of the procedures used for the manufacture of Type I compounds, are prepared according to known methods, for example, by treatment with a halogenating reagent, e.g. thionyl chloride.

In the above methods for the preparation of the Type II compounds, the latter may be dehydrated under the conditions of the reaction and yield directly the Type III unsaturated compounds of this invention without isolating the Type II compounds serving as the starting materials for the latter.

The Type III compounds of this invention are obtained, for example, by splitting off $R_0$—H from compounds having the following formula

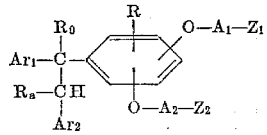

in which $Ar_1$, $Ar_2$, $R_a$, $R$, $A_1$, $A_2$, $Z_1$, $Z_2$ and $R_0$ have the above-given meaning, $R_0$ being hydroxyl or esterified hydroxyl, and, if desired, replacing in a resulting compound having a hydrogen attached to the ethene double bond, such hydrogen by halogeno, and/or, if desired, converting a resulting salt into the free compound or into another salt, and/or, if desired, converting a resulting compound into an N-oxide or a quaternary ammonium compound thereof, and/or, if desired, converting a resulting compound or an N-oxide thereof into a salt thereof, and/or, if desired, separating a mixture of isomers into the single isomers.

In case the group $R_0$ in the above formula stands for hydroxyl, the above reaction is carried out by dehydration. The latter may be performed according to known methods, for example, by treatment with acidic reagents. The latter are primarily of inorganic nature, and are represented by mineral acids, e.g. hydrochloric, sulfuric, phosphoric acid and the like. Also useful are organic acids, particularly organic sulfonic acids, e.g. p-toluene sulfonic acid and the like; these may be used together with a water separator to remove the generated water. These acids may be employed according to different procedures: Gaseous acids, for example, hydrogen chloride, may be passed through a solution of the starting material in a suitable solvent, such as a lower alkanol, e.g. ethanol, propanol and the like, or in acetic acid or any other appropriate diluent, or they may first be dissolved in one of these solvents and then added to the starting material. Sulfuric acid may be used in dilute or concentrated form, and phosphoric acid in admixture with phosphorus pentoxide as polyphosphoric acid. Other dehydrating agents are acid halides, such as inorganic acid halides, e.g. thionyl chloride and the like, or organic acid halides, such as organic sulfonic acid halides, e.g. p-toluene sulfonic acid chloride and the like, which may be employed in solution with an inert solvent, e.g. benzene, toluene and the like. The dehydration reaction is carried out while cooling, at room temperature, or preferably at an elevated temperature, if necessary, in a closed vessel and/or in the atmosphere of an inert gas, e.g. nitrogen. Dehydration with formation of the desired compounds may also occur during the preparation of the alcohol starting materials, particularly, if acidic conditions prevail; these methods will be described below.

An esterified hydroxyl group representing the group $R_0$ in the above starting material is more particularly a hydroxyl group esterified with an organic acid, such as an organic carboxylic acid, e.g. acetic, propionic, benzoic acid and the like. Splitting off of an organic carboxylic acid of the formula $R_0$—H, in which $R_0$ is an acyloxy radical, to introduce the double bond, is carried out according to known methods, for example, by heating the starting material, if necessary, in the presence of a diluent and/or a suitable reagent, such as dimethylsulfoxide and the like. Other esterified hydroxyl groups are, for example, halogeno (representing a hydroxyl group esterified with a hydrohalic acid), e.g. chloro, bromo and the like, or organic sulfonyloxy, e.g. methylsulfonyloxy, 4-methyl-phenyl-sulfonyloxy, 4-bromo-phenyl-sulfonyloxy, 3-nitro-phenyl-sulfonyloxy and the like. Removal from the starting material of a compound of the formula $R_0$—H, in which $R_0$ is halogeno or organic sulfonyloxy is carried out according to known methods, for example, by heating and/or treatment with a base. Usually, in preparing a starting material, in which a hydroxyl group is esterified with a hydrohalic acid or an organic sulfonic acid, the starting material having an esterified hydroxyl group cannot be isolated, but is directly converted into the desired unsaturated product.

As mentioned above, the preparation of the Type II compounds, or more especially, the esterification of the tertiary hydroxyl group in the latter, may directly lead to the formation of a triaryl-ethene Type III compound. Particularly, the esterification of a triaryl-ethanol Type II compound with a hydrohalic acid (using, for example, thionyl chloride and the like, as the reagent) or with an organic sulfonic acid (using, for example, p-toluene sulfonic acid chloride and the like, as the reagent) may be accompanied with dehydration and the formation of an unsaturated Type III compound. Furthermore, acidic conditions used during the esterification of the tertiary hydroxyl group may lead to its removal and the formation of the unsaturated Type III compounds.

The latter may also be obtained by converting in a compound of the formula

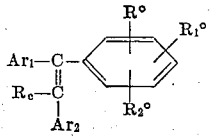

in which $Ar_1$, $Ar_2$, $R_c$, $R_1°$, $R_2°$ and $R°$ have the previously-given meaning, with the proviso that at least one of the groups $R_1°$, $R_2°$ and $R°$ is a group capable of being converted into a group of the formula $-O-A_1-Z_1$, $-O-A_2-Z_2$ and $-O-A_3-Z_3$, respectively, or a salt thereof, any group $R_1°$, $R_2°$ and $R°$ capable of being so converted into the group of the formula $-O-A_1-Z_1$, $-O-A_2-Z_2$ and $-O-A_3-Z_3$, respectively, and, if desired, converting a resulting salt into the free compound or into another salt, and/or, if desired, converting a resulting compound into an N-oxide or a quaternary ammonium compound thereof, and/or, if desired, converting a resulting compound or an N-oxide thereof into a salt thereof, and/or, if desired, separating a mixture of isomers into the single isomers.

The above procedure of preparing the compounds of this invention is carried out according to known methods, such as those described before. The starting material used in the above reaction is prepared according to known methods, for example, by reacting a compound of the formula

in which $Ar_1$, $Ar_2$ and $R_a$ have the previously-given meaning, with an organo-metallic compound of the formula

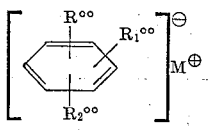

in which $R_1°°$, $R_2°°$, $R°°$ and $M^\oplus$ have the previously-given meaning, and, if necessary, eliminating from a resulting compound of the formula

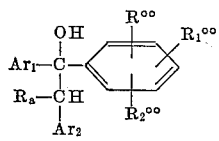

in which $Ar_1$, $Ar_2$, $R_a$, $R_1°°$, $R_2°°$ and $R°°$ have the previously-given meaning, the elements of water, and/or, if necessary, converting in a resulting compound substituted by a substituent capable of being converted into hydroxyl, such substituent into hydroxyl, and/or, if desired, converting in a resulting compound substituted by hydroxyl, the latter into any of the other substituents capable of being converted into N,N-disubstituted amino-lower alkyl-oxy, and/or, if desired, converting in a resulting compound, in which $R_a$ is hydrogen, the latter into halogen. The above reactions are carried out according to the procedures described before.

In a resulting triaryl-ethene Type III compound of this invention having the previously-given formula, in which $R_a$ is hydrogen, such hydrogen may be replaced by halogeno according to known methods, for example, by treatment with an N-halogeno-carboxylic acid amide, e.g. N-chloro-acetamide and the like, or, preferably, with an N-halogeno-dicarboxylic acid imide, e.g. N-chloro-succinimide, N-bromo-succinimide, N-chloro-hydantoin and the like, in hte presence of a suitable diluent, e.g. chloroform, methylene chloride, benzene and the like, if necessary, at an elevated temperature. Replacement of a hydrogen attached to a carbon atom of the ethene double bond by halogeno according to the above method may be accompanied by replacement of a hydrogen by halogeno in another portion of the molecule; for example, upon treatment with N-chloro-succinimide, a hydrogen in a lower alkyl substituent, e.g. methyl, of a resulting triarylethene compound may be replaced by chloro.

A resulting acid addition salt is converted into the free base, for example, by treating it with an alkaline reagent, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia and the like, or by treatment with a suitable hydroxyl ion exchange resin.

A resulting acid addition salt can be converted into another salt according to known methods, for example, by treatment with a suitable anion exchange preparation. Furthermore, an acid addition salt, particularly, an addition salt with an inorganic acid, may be converted into another acid addition salt, for example, by reacting it with a suitable metal, e.g. sodium, barium, silver and the like, salt of an acid, preferably in the presence of a diluent, in which a resulting inorganic salt is insoluble and is thus removed from the reaction medium.

A free base is converted into an acid addition salt thereof according to known methods, for example, by reacting it or a solution thereof in a suitable solvent or solvent mixture with the acid or a solution thereof, or with a suitable anion exchange preparation, and isolating the desired salt. A salt may be obtained in the form of a hydrate thereof or may include solvent of crystallization.

An N-oxide of the compounds of this invention is prepared according to known methods, for example, by treating the free base with a suitable N-oxidizing reagent, such as hydrogen peroxide, ozone or a peracid, e.g. peracetic, perbenzoic, monoperphthalic, persulfuric acid and the like, in the presence of a suitable inert diluent. An N-oxide is converted into an acid addition salt thereof according to the above procedure.

Quaternary ammonium derivatives of the compounds of this invention are obtained according to known methods, for example, by reacting the base with the reactive ester of an alcohol and a strong acid, such as, for example, with one of the lower alkyl halides, di-lower alkyl sulfates, lower alkyl organic sulfonates or phenyl-lower alkyl halides described above. The quaternizing reaction is performed in the absence or presence of a solvent, while cooling or at an elevated temperature, if necessary, in a closed vessel and/or in the atmosphere of an inert gas, e.g. nitrogen and the like.

Resulting quaternary ammonium compounds may be converted into other quaternary ammonium compounds, such as the quaternary ammonium hydroxides, for example, by reacting a quaternary ammonium halide with silver oxide, or a quaternary ammonium sulfate with barium hydroxide, by treating a quaternary ammonium salt with a hydroxyl ion exchange preparation or any other suitable method. A quaternary ammonium hydroxide is converted into a quaternary ammonium salt by reacting the former with a suitable acid. A quaternary ammonium salt is also converted directly into another quaternary ammonium salt; for example, a quaternary ammonium iodide, when reacted with freshly prepared silver chloride or with hydrochloric acid in anhydrous methanol, yields the desired quaternary ammonium chloride, or a quaternary ammonium salt, when treated with a suitable anion exchange preparation, can be converted into another quaternary ammonium salt. A quaternary ammonium compound may be obtained in the form of a hydrate thereof or may contain solvent of crystallization.

A mixture of resulting isomeric compounds may be separated into the single isomers, for example, a mixture of cis- and trans-isomers or of diastereo-isomers is separated into the individual cis, trans or racemic compounds on the basis of physico-chemical differences, such as solubility, for example, by fractional crystallization, as well as by fractional distillation and the like. Racemates are resolved in the optically active d- and l-forms according to known resolution procedures, for example, by forming a salt of the free racemic base with one of the optically active forms of an acid containing an asymmetric carbon atom. Especially useful as optically active forms of salt-forming acids having an asymmetric carbon atom are D-tartaric (l-tartaric) and L-tartaric (d-tartaric) acid, as well as the optically active forms of malic, mandelic, camphor 10-sulfonic, quinic acid and the like. A resulting mixture of salts of the optically active acid with the antipodes of the base racemate is separated into the single salts on the basis of physico-chemical differences, for example, by fractional crystallization. From a resulting salt, the free and optically active base is obtained according to the method described above, and a free and optically active base can be converted into its acid addition salt, N-oxide, salt of an N-oxide, salt of an N-oxide or quaternary ammonium compound according to the procedures described above.

The invention also comprises any modification of the process wherein a compound formed as an intermediate at any stage of the process, is used as the starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a mixture of 5.32 g. of magnesium in diethyl ether is added slowly a solution of 35.16 g. of 4-chlorobenzyl chloride in 200 ml. of diethyl ether; the reaction is initiated by adding a few drops of methyl iodide, and after completing the addition, the mixture is stirred and refluxed for thirty minutes, and then cooled. A solution of 20.0 g. of 2,4-di-(2-N,N-diethylaminoethyloxy)-benzophenone in 150 ml. of diethyl ether is added slowly; the reaction mixture is refluxed for three hours and then poured into a mixture of ice and a saturated aqueous solution of ammonium chloride. The water layer is separated and extracted several times with diethyl ether; the combined organic layers are stirred with solid sodium chloride, decanted, dried over sodium sulfate an evaporated. The oily residue is crystallized with pentane to yield 25.3 g. of 2-(4-chloro-phenyl)-1-[2,4-di-(2-N,N-diethylaminoethyloxy) - phenyl] - 1 - phenyl - ethanol of the formula

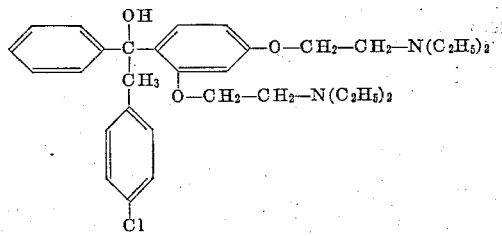

which is recrystallized from a mixture of ethanol and water, M.P. 130–131°. It may be converted into its maleate by treating a solution of the free base with maleic acid.

The starting material used in the above procedure is prepared as follows: To a cold solution of 89.1 g. of 2,4-dihydroxy-benzophenone in 500 ml. of N,N-dimethyl-formamide is added 40 g. of a 53 percent suspension of sodium hydride in mineral oil while cooling and stirring. After the hydrogen evolution ceases, 488 ml. of a toluene solution containing 0.231 g./ml. or a total of 113 g. of 2-N,N-diethylaminoethyl chloride is added in a slow stream. The resulting orange mixture is refluxed for three hours, allowed to stand overnight at room temperature, and filtered. The solid material is washed with benzene, the washings are combined with the filtrate and evaporated under reduced pressure. Water is added, and the organic material is extracted with diethyl ether; the organic layer is washed with 200 ml. of a 1:1-mixture of concentrated hydrochloric acid and water and discarded, and the aqueous acidic solution is adjusted to pH 8 with a 50 percent aqueous solution of sodium hydroxide. The organic material is extracted with diethyl ether, the extracts are swirled with solid sodium chloride, decanted, dried over sodium sulfate, and evaporated under reduced pressure. The residual brown oil is distilled under reduced pressure to yield the 2,4-di-(2-N,N-diethylamino-ethyloxy)-benzophenone, B.P. 180–190°/0.2 mm.

*Example 2*

Dry hydrogen chloride gas is bubbled through a suspension of 2.0 g. of 2-(4-chloro-phenyl)-1-[2,4-di-(2-N,N-diethylaminoethyloxy)-phenyl]-1-phenyl-ethanol in 30 ml. of absolute ethanol; the solution is then refluxed for three hours and evaporated to dryness. The oily residue is dissolved in water, solid sodium carbonate is added to adjust the pH to 8, and the mixture is extracted with diethyl ether. The organic extract is dried over sodium sulfate and evaporated to yield 1.5 g. of an oil, which is dissolved in hexane and chromatographed on 50 g. of neutral aluminum oxide containing 5 percent water, taking fractions of 25 ml. each:

| Solvent | Amount, ml. | Fractions |
|---|---|---|
| Hexane | 75 | 1 to 3 |
| Hexane containing 20 percent of benzene | 100 | 4 to 7 |
| Hexane containing 50 percent of benzene | 150 | 8 to 13 |
| Benzene | 100 | 14 to 17 |
| Benzene containing 20 percent of diethyl ether | 125 | 18 to 22 |
| Benzene containing 50 percent of diethyl ether | 100 | 23 to 26 |
| Diethyl ether | 75 | 27 to 29 |

Fractions 7 to 22 yield 1.0 g. of the desired 2-(4-chloro-phenyl)-1-[2,4-di-(2 - N,N - diethylaminoethyloxy)-phenyl]-1-phenyl-ethene of the formula

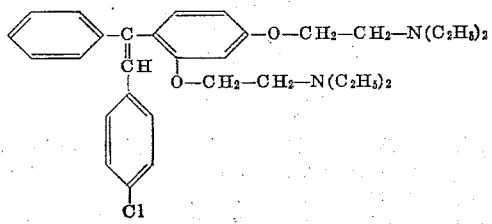

as an oil, which analyzes as follows:
Calcd. for $C_{32}H_{41}ClN_2O_2$: C, 73.75; H, 7.93; N, 5.38.
Found: C, 73.76; H, 7.86; N, 5.53.

It is converted into its maleate by treating a solution of the free compound with maleic acid and evaporating the solvent.

*Example 3*

To a mixture of 4.8 g. of 2-(4-chloro-phenyl)-1-[2,4-di-(2-N,N-diethylaminoethyloxy)-phenyl]-1 - phenyl - ethene hydrochloride (the base, prepared according to the method described in Example 2, is dissolved in ethanol, the solution is saturated with hydrogen chloride, and the solvent is removed under reduced pressure) in 50 ml. of chloroform is added 1.5 g. of N-chloro-succinimide; the reaction mixture is then refluxed for 18 hours, evaporated to dryness and taken up in water. The pH is adjusted to 8 by adding a 2 N aqueous solution of sodium carbonate, and the organic material is extracted with diethyl ether. The ether layer is washed with a dilute solution of sodium hydroxide and water, swirled with solid sodium chloride and decanted; the organic solution is dried over sodium sulfate and evaporated. The resulting brown oil is dissolved in 25 ml. of ethyl methyl ketone and added to 40 g. of citric acid in 150 ml. of ethyl methyl ketone. Upon cooling, the crystalline 2-chloro-2-(4-chloro-phenyl)-1-[2,4-di - (2 - N,N - diethylaminoethyloxy)-phenyl]-1-phenyl-ethene dicitrate of the formula

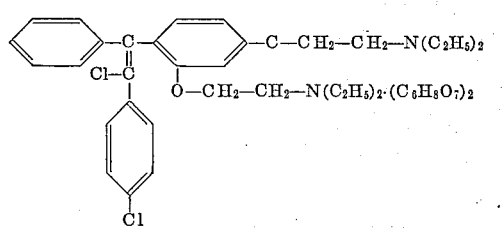

precipitates, is filtered off (yield: 8.7 g.) and is recrystallized from a mixture of ethanol and diethyl ether, M.P. 107–108°.

*Example 4*

To a Grignard reagent (prepared from 0.871 g. of magnesium in 40 ml. of diethyl ether and 5.86 g. of 2-chloro-benzyl chloride in 50 ml. of diethyl ether as described in Example 1) is added 5.0 g. of 2,4-di-(2-N,N-diethylaminoethyloxy)-benzophenone in 25 ml. of diethyl ether while cooling and stirring. After refluxing for three hours, the reaction mixture is decomposed with a saturated aqueous solution of ammonium chloride to liberate the 2-(2-chloro-phenyl)-1-[2,4-di-(2 - N,N-diethylaminoethyloxy)-phenyl]-1-phenyl-ethanol of the formula

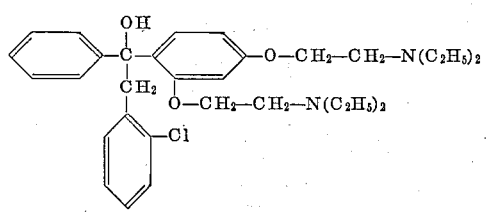

which is not isolated.

Upon working up the reaction mixture according to the procedure described in Example 2, during which the organic material is extracted with hydrochloric acid, the tertiary alcohol is dehydrated to yield 7.8 g. of 2-(2-chloro-phenyl)-1-[2,4-di-(2,N,N-diethylaminoethyloxy)-phenyl]-1-phenyl-ethene of the formula

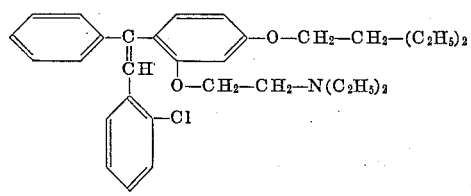

which is isolated as follows: The oily material is dissolved in a 1:1-mixture of benzene and hexane and chromatographed on 234 g. of neutral aluminum oxide containing 5 percent of water, taking fractions of 50 ml. each:

| Solvent | Amount, ml. | Fractions |
|---|---|---|
| 1:1-mixture of benzene and hexane | 400 | 1 to 8 |
| Benzene | 400 | 9 to 16 |
| Benzene containing 20 percent of diethyl ether | 450 | 17 to 25 |
| Benzene containing 50 percent of diethyl ether | 250 | 26 to 30 |
| Diethyl ether | 250 | 31 to 35 |

Fractions 9 to 22 are combined to yield 4.7 g. of the pure product, which analyzes as follows:

Calcd. for $C_{32}H_{41}ClN_2O_2$: C, 73.41; H, 7.57; N, 5.96. Found: C, 73.71; H, 7.93; N, 5.37.

The free base is dissolved in ethyl methyl ketone and treated with a solution of citric acid in the same solvent; upon diluting the solution with diethyl ether, the desired 2-(2-chloro-phenyl)-1-[2,4-di-(2 - N,N-diethylaminoethyloxy)-phenyl]-1-phenyl-ethene dicitrate precipitates, M.P. 90–96°.

*Example 5*

To a Grignard reagent prepared from 13.5 g. of 4-chloro-benzyl chloride and 2.01 g. of magnesium in 150 ml. of diethyl ether, is added dropwise a solution of 11.9 g. of 2,4-di-(2-N,N - diethylaminoethyloxy) - 4' - methyl-benzophenone in 50 ml. of diethyl ether while stirring and cooling in an ice-bath. After completion of the addition, the reaction mixture is refluxed for three hours and is then allowed to stand for twenty hours. The complex is decomposed by adding an aqueous solution of ammonium chloride, and the organic material is extracted three times with diethyl ether. The basic material is extracted from the combined organic layers with three portions of 2 N hydrochloric acid; the acidic phase is made alkaline with crystalline sodium carbonate and the free base is washed out with three portions of diethyl ether. The organic extract is evaporated to yield 12.6 g. of a viscous oil which is chromatographed on 370 g. aluminum oxide (neutral activity III). The oily 2-(4-chloro-phenyl)-1-[2,4-di-(2-N,N - diethylaminoethyloxy)-phenyl]-1-(4-methyl-phenyl)-ethene of the formula

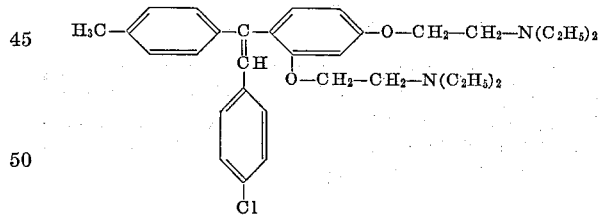

is eluted with benzene, whereas the crystalline 2-(4-chloro-phenyl)-1-[2,4-di-(2 - N,N - diethylaminoethoxy)-phenyl]-1-(4-methyl-phenyl)-ethanol of the formula

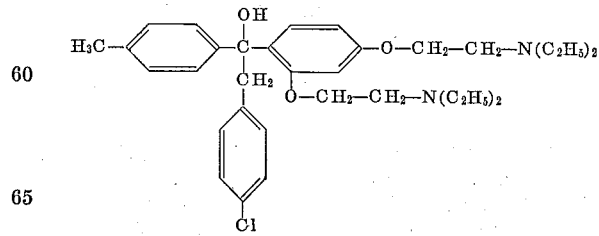

is eluted with a 1:1-mixture of benzene and diethyl ether and melts at 118–120° after recrystallization from a mixture of ethanol and water.

A solution of 5.6 g. of 2-(4-chloro-phenyl)-1-[2,4-di-(2 - N,N - diethylaminoethyloxy) - phenyl]-1-(4-methyl-phenyl)-ethene in a 1:1-mixture of hexane and benzene is placed onto a column of 280 g. of neutral aluminum oxide (activity III); the chromatogram is developed by taking fractions of 100 ml. each of progressively more polar solvents:

| Fraction | Solvent | Yield | Product |
|---|---|---|---|
| 1 | 1:1-mixture of hexane and benzene. | | |
| 2 | do | | Turbid oil. |
| 3 | do | | Do. |
| 4 | do | 0.1488 | Do. |
| 5 | do | 0.3138 | Clear yellow oil. |
| 6 | do | 0.1360 | Do. |
| 7 | do | 0.2991 | Do. |
| 8 | do | 0.2941 | Do. |
| 9 | do | 0.2365 | Do. |
| 10 | do | 0.1597 | Do. |
| 11 | 1:2-mixture of hexane and benzene. | 0.1812 | Do. |
| 12 | do | 0.1999 | Do. |
| 13 | do | 0.1972 | Do. |
| 14 | do | 0.2066 | Do. |
| 15 | do | 0.1543 | Do. |
| 16 | do | 0.1344 | Do. |
| 17 | Benzene | 0.1248 | Do. |
| 18 | do | 0.2026 | Do. |
| 19 | do | 0.2074 | Do. |
| 20 | do | | Do. |
| 21 | do | | Do. |
| 22 | Diethyl ether | | Do. |
| 23 | do | | Do. |
| 24 | do | 0.2320 | Do. |
| 25 | do | | Do. |
| 26 | do | | Do. |
| 27 | do | Trace | Yellow oil. |
| 28 | Ethyl acetate (500 ml.) | Trace | Do. |

Nuclear magnetic reasonance studies carried out with fraction No. 7 and fraction No. 18 show, that the product of the former is the 2-(4-chloro-phenyl)-1-[2,4-di-(2-N,N - diethylaminoethyloxy)-phenyl]-1-(4-methyl-phenyl)-ethene of the formula

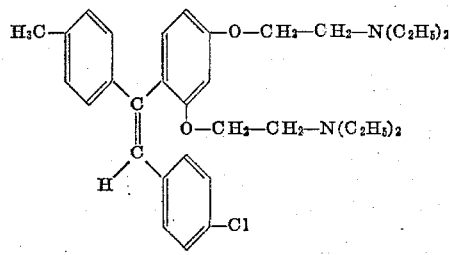

in which the 2,4-di-(2-N,N-diethylaminoethyloxy)-phenyl group is cis to the 4-chloro-phenyl group, and that the product of fraction 18 is the 2-(4-chloro-phenyl)-1-[2,4-di - (2-N,N-diethylaminoethyloxy)-phenyl]-1-(4-methyl-phenyl)-ethene of the formula

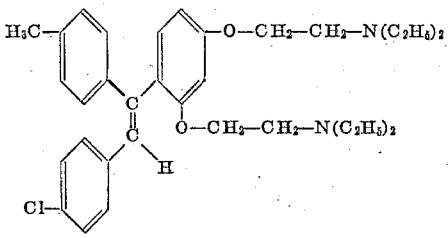

in which the 2,4-di-(2-N,N-diethylaminoethyloxy)-phenyl group is trans to the 4-chloro-phenyl group.

The starting material used in the above procedure is prepared as described in Example 1; the 2,4-di-(2-N,N-diethylaminoethyloxy)-4'-methyl-benzophenone is collected at 200–207°/0.07 mm.

*Example 6*

A mixture of 2.0 g. of 2-(4-chloro-phenyl)-1-[2,4-di-(2 - N,N - diethylaminoethyloxy) - phenyl]-1-(4-methyl-phenyl)-ethanol in 15 ml. of acetic acid anhydride and 15 ml. of pyridine is refluxed for three hours; the solvents are evaporated under reduced pressure and the residue is taken up in water. The pH of the mixture is adjusted to 8 with sodium carbonate, and the organic material is extracted with diethyl ether. The organic phase is dried over sodium sulfate and is evaporated under reduced pressure to yield an oily residue which contains crystalline material. Upon adding petroleum ether, the crystalline material representing non-dehydrated starting material, M.P. 115–120°, precipitates and is filtered off; the filtrate yields 1 g. of an oily product which is chromatographed on 30 g. of neutral aluminum oxide (activity III); the 2 - (4 - chloro-phenyl) - 1 - [2,4-di-(2-N,N-diethylaminoethyloxy)-phenyl]-1-(4-methyl-phenyl)-ethene is eluted with a 1:1-mixture of hexane and benzene, and benzene, and is identical with the product obtained according to the procedure described in Example 5.

*Example 7*

A mixture of 2.2 g. of 2-(4-chloro-phenyl)-1-[2,4-di-(2 - N,N - diethylaminoethyloxy) - phenyl]-1-(4-methyl-phenyl)-ethene and 0.67 g. of N-chloro-succinimide in 22 ml. of chloroform is refluxed for 18 hours. After removal of the solvent, water is added to the residue and the pH is adjusted to approximately 8 with sodium carbonate. The organic material is extracted with diethyl ether; the organic phase is evaporated to yield 2.0 g. of a dark oil, which is dissolved in dilute hydrochloric acid. The solution is evaporated, the gummy residue is again treated for 18 hours with 0.67 g. of N-chloro-succinimide in boiling chloroform. The reaction mixture is worked up as shown above to yield the 2-chloro-2-(4-chloro-phenyl)-1-(4-chloromethyl - phenyl) - 1 - [2,4-di-(2-N,N-diethylaminoethyloxy)-phenyl]-ethene of the formula

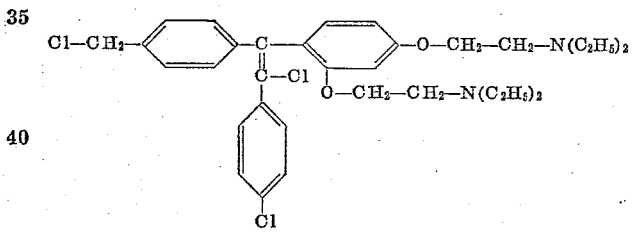

which is converted into its dicitrate, using ethyl methyl ketone as the solvent; M.P. 110–112°.

*Example 8*

To a Grignard reagent prepared from 14.1 g. of 4-chlorobenzyl chloride and 2.0 g. of magnesium in 180 ml. of diethyl ether is added 13.9 g. of 2,4-di-(2-N,N-diethylaminoethyloxy) - 4' - phenyl-benzophenone (prepared by converting biphenyl 4-carboxylic acid into its chloride by treatment with phosphorus pentachloride, and reacting a mixture of the resulting biphenyl 4-carboxylic acid chloride and resorcinol dimethyl ether in carbon disulfide with aluminum chloride; the ether groups in the resulting 2,4-dimethoxy-4'-phenyl-benzophenone are split by treatment with pyridine hydrochloride, and the sodium salt of the resulting 2,4-dihydroxy-4'-phenyl-benzophenone is reacted with 2-N,N-diethylaminoethyl chloride according to the procedure described in Example 1) in 60 ml. of diethyl ether. The reaction mixture is refluxed for five hours and then allowed to stand for twenty hours; the complex is decomposed with a saturated aqueous solution of ammonium chloride, and the aqueous phase is extracted three times with diethyl ether. The combined organic solutions are extracted three times with 2 N hydrochloric acid; the acidic solutions are made basic with sodium carbonate and again extracted three times with diethyl ether. The organic extracts yield a tan-colored oil, which crystallizes partially; the crystalline material is washed with cold diethyl ether and collected; yield: 7.8 g. It represents the 1-(4-biphenylyl)-

2 - (4 - chloro - phenyl) - 1 - [2,4 - di - (2 - N,N - diethyl-aminoethyloxy)-phenyl]-ethanol of the formula

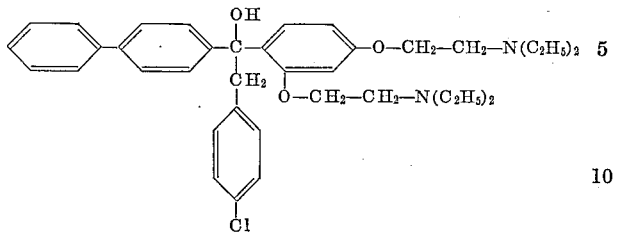

which melts at 123–124° after recrystallization from a mixture of ethanol and water.

Example 9

A solution of 7.7 g. of 1-(4-biphenylyl)-2-(4-chloro-phenyl) - 1 - [2,4 - di - (2 - N,N - diethylaminoethyloxy)-phenyl]-ethanol in ethanol saturated with hydrogen chloride is refluxed for three hours, and is then evaporated to dryness. The residue is taken up into water; the aqueous mixture is made basic with sodium carbonate and extracted three times with diethyl ether and once with ethyl acetate. The combined organic extracts are washed with a saturated solution of sodium chloride in water, dried over sodium carbonate and evaporated to dryness to yield 7.0 g. of an amber-colored oil. The latter is chromatographed on neutral aluminum oxide (activity III); the desired 1-(4-biphenylyl)-2-(4-chloro-phenyl)-1-[2,4 - di - (2 - N,N - diethylaminoethyloxy) - phenyl]-ethene of the formula

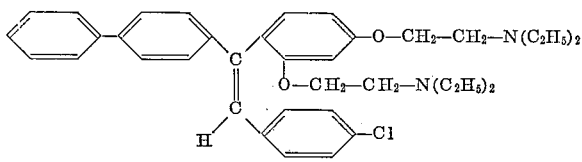

is eluted with a 1:1-mixture of hexane and benzene; in this compound the 4-chloro-phenyl group is cis to the 2,4-(2-N,N-diethylaminoethyloxy)-phenyl group.

The subsequent fractions eluted with benzene and mixtures of benzene and diethyl ether are combined (yield: 6.3 g.) and treated with a diethyl ether solution of hydrogen chloride; resulting 1-(4-biphenylyl)-2-(4-chloro-phenyl) - 1 - [2,4 - di - (2 - N,N - diethylaminoethyloxy)-phenyl]-ethene dihydrochloride of the formula

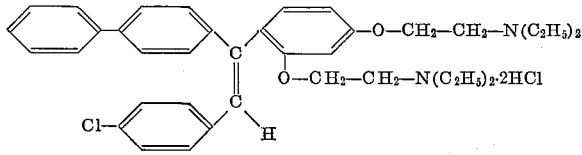

is recrystallized from a 1:5:5-mixture of ethanol, acetone and diethyl ether and melts at 212–214°; in this compound the 4-chlorophenyl group is trans to the 2,4-(2-N,N-diethylaminoethyloxy)-phenyl group.

Example 10

To a Grignard reagent prepared from 13.2 g. of 4-chlorobenzyl chloride and 2.16 g. of magnesium in 180 ml. of diethyl ether, is added dropwise a solution of 13.2 g. of 2,4-di-[2-(1-piperidino)-ethyloxy-benzophenone in 65 ml. of benzene while cooling in an ice-bath. The reaction is then refluxed for 3½ hours, allowed to stand for twenty hours at room temperature and decomposed with an aqueous solution of ammonium chloride. The organic material is extracted into diethyl ether; the ether solution is washed with 2 N hydrochloric acid, and the acidic washings are neutralized with sodium carbonate. The crystalline precipitate is collected, and the desired 2 - (4 - chloro-phenyl) - 1 - phenyl - 1 - {2,4 - di- [2 - (1 - piperidino) - ethyloxy] - phenyl} - ethanol of the formula

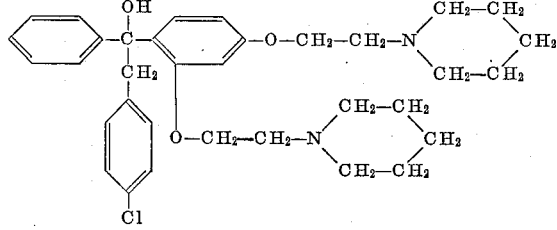

is purified by repeated recrystallizations from aqueous ethanol, M.P. 153–154°.

The starting material used in the above procedure may be prepared as follows: A solution of 21.4 g. of 2,4-dihydroxybenzophenone and 38.6 g. of 1-(2-chloroethyl)-piperidine hydrochloride in 125 ml. of N,N-dimethyl-formamide and 125 ml. of toluene is stirred and cooled in an ice bath while adding a total of 19.2 g. of a 53 percent mineral oil suspension of sodium hydride in small portions. The temperature is then raised to 30–35° and stirring is continued for twenty hours; the inorganic precipitate is filtered off, the filtrate is concentrated to about 50 ml. and is treated with water. The organic material is extracted three times with ethyl acetate; the organic solutions are washed with 2 N hydrochloric acid, and the acidic washings are made basic with sodium carbonate. The organic material is extracted into ethyl acetate, and the organic solution is worked up to yield the tan-colored, oily 2,4-di-[2-(1-piperidino)-ethyloxy]-benzophenone; its dihydrochloride melts at 202–204°.

Example 11

For a few minutes dry hydrogen chloride gas is passed through a suspension of 5.3 g. of 2-(4-chloro-phenyl)-1-phenyl - 1 - {2,4 - di-[2-(1-piperidino)-ethyloxy]-phenyl}-ethanol in ethanol; the resultant orange solution is refluxed for two hours and is then evaporated to dryness under reduced pressure. The residue is dissolved in water, the aqueous solution is made basic with solid sodium carbonate and is extracted with diethyl ether; the organic solution is swirled over sodium chloride, decanted, dried over sodium sulfate and evaporated. The turbid, light-brown oil (yield: 4.9 g.) is chromatographed on 125 g. of neutral aluminum oxide (activity III); the eluate with a 1:1-mixture of hexane and benzene yields 0.95 g. of the oily 2-(4-chloro - phenyl) - 1 - phenyl - 1 - {2,4 - di-[2 - (1 - piperidino)-ethyloxy]-phenyl}-ethene of the formula

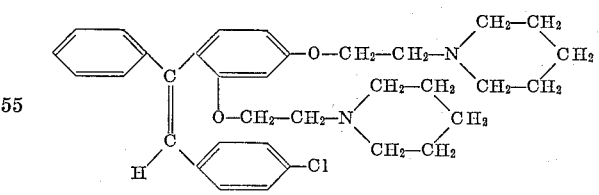

in which the 2,4 - di - [2 - (piperidino) - ethyloxy]-phenyl group is cis to the 4-chloro-phenyl group, whereas the combined eluates with benzene and with benzene containing 20 percent diethyl ether yield 1.0 g. of the more polar 2-(4-chloro-phenyl)-1-phenyl-1-{2,4-di-[2-(1-piperidino)-ethyloxyphenyl}ethene of the formula

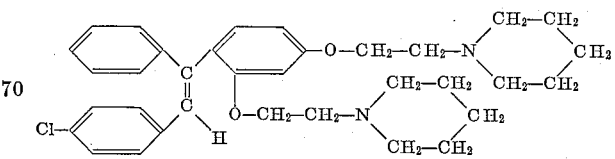

in which the 2,4 - di - [2 - (piperidino)-ethyloxy]-phenyl group is trans to the 4-chloro-phenyl group.

23

Example 12

To a Grignard reagent prepared from 3.6 g. of 4-chlorobenzyl chloride and 0.54 g. of magnesium in 25 ml. of diethyl ether is added 4.0 g. of 2,3,4-tri-(2-N,N-diethylaminoethyloxy)-benzophenone in 15 ml. of diethyl ether. The reaction mixture is refluxed for three hours and then decomposed with a saturated aqueous solution of ammonium chloride. The organic material is extracted with diethyl ether, the organic solution is washed with 2 N hydrochloric acid, and the acidic washings are made basic (pH —8) with sodium carbonate. The organic material is extracted with three portions of diethyl ether, and the organic solutions yield 4.3 g. of a tan-colored oil which is partially crystalline. The residue is triturated with pentane, the solution is separated and evaporated to yield 2.0 g. of an oily material which is chromatographed on 60 g. of neutral aluminum oxide (activity III). The oily 2-(4-chloro-phenyl)-1-[2,3,4-tri-(2-N,N-diethylaminoethyloxy)-phenyl]-1-phenylethanol of the formula

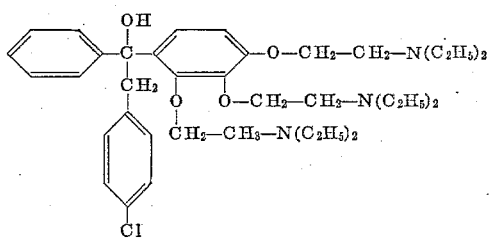

is eluted with a 5:1-mixture of benzene and diethyl ether.

The starting material used in the above procedure is prepared as follows: A mixture of 13.0 g. of pyrogallol, 14.4 g. of benzoic acid and 12.0 g. of finely powdered anhydrous zinc chloride is heated at 160° for four hours. Upon cooling, the resulting oil solidifies and is treated with 2 N hydrochloric acid; the resulting mixture is extracted with diethyl ether and ethyl acetate, and the combined organic solutions are washed neutral with aqueous sodium hydrogen carbonate and then extracted with a dilute aqueous solution of potassium hydroxide. Upon acidification of the aqueous extract with concentrated hydrogen chloride, the organic material is extracted with diethyl ether, and the organic extract is washed with a concentrated aqueous sodium chloride solution and dried over sodium sulfate. On evaporation, a dark oil is obtained, which is distilled. The desired 2,3,4-trihydroxybenzophenone is collected at 150–195°/0.08 mm.; it is suspended in pentane and then recrystallized from aqueous ethanol, M.P. 142–144°.

To a solution of 2,3,4-trihydroxy-benzophenone in 48 ml. of N,N-dimethylformamide, cooled in an ice bath, are added 9.55 g. of 2-N,N-diethylaminoethyl chloride (in the form of 48 ml. of a toluene solution containing 0.1998 g./ml. of the base), and then in portions 3.48 g. of a 53 percent suspension of sodium hydride while stirring. The dark mixture is agitated for three hours at room temperature and allowed to stand overnight; after evaporation under reduced pressure, the residue is taken up into water, and the organic material is extracted with diethyl ether. The organic solution is washed three times with 2 N hydrochloric acid and with water, and the pH of the combined aqueous solutions is adjusted to about 8 with dilute aqueous sodium hydroxide. The organic material is extracted with diethyl ether; the organic solution is washed with a saturated aqueous solution of sodium chloride, dried over sodium sulfate and evaporated to dryness under reduced pressure. The resulting brown oil (yield: 4.9 g.) is chromatographed on 150 g. of neutral aluminum oxide containing five percent of water. The desired 2,3,4-tri-(2-N,N-diethylaminoethyloxy)-benzophenone is eluted as an oil with mixtures of benzene and hexane, and benzene and diethyl ether.

24

Example 13

A suspension of 0.9 g. of 2-(4-chloro-phenyl)-1-[2,3,4-tri - (2 - N,N - diethylaminoethyloxy) - phenyl]-1-phenylethanol in ethanol is treated with gaseous hydrogen chloride and worked up as described in Example 2 to yield the oily 2-(4-chloro-phenyl)-1-[2,3,4-tri-(2-N,N-diethylaminoethyloxy)-phenyl]-1-phenylethene of the formula

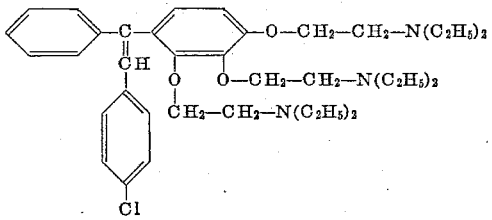

Example 14

To a Grignard reagent (prepared by reacting 0.87 g. of magnesium in 40 ml. of diethyl ether with 7.12 g. of 2,4-dichlorobenzyl chloride in 50 ml. of diethyl ether, initiating the reaction with a small amount of methyl iodide, and refluxing it for thirty minutes) is added while cooling, 5.0 g. of 2,4-di-(2-N,N-diethylaminoethyloxy)-benzophenone in 25 ml. of diethyl ether. The reaction mixture is refluxed for five hours while stirring; after cooling, a saturated aqueous solution of ammonium chloride is added, and the layers are separated. The aqueous phase is extracted several times with ethyl acetate; the organic layers are combined and washed with a saturated aqueous solution of sodium chloride. After drying over sodium sulfate and evaporating, the organic phase yields 6.1 g. of an oil, which does not crystallize; it is dissolved in a 1:1-mixture of benzene and hexane and chromatographed on 180 g. of aluminum oxide containing 5 percent of water, taking fractions of 50 ml. each:

| Solvent | Amount, ml. | Fractions |
|---|---|---|
| 1=1-mixture of benzene and hexane | 600 | 1 to 12 |
| Benzene | 350 | 13 to 19 |
| 1=1-mixture of diethyl ether and benzene | 450 | 20 to 28 |
| Diethyl ether | 200 | 29 to 32 |
| Ethyl acetate | 50 | 33 |

The combined fractions 7 to 21 yield a crystalline material, which is suspended in cold petroleum ether; the solution is filtered and recrystallized from a mixture of ethanol and water to yield the desired 2-(2,4-dichloro-phenyl)-1 - [2,4-di(2-N,N-diethylaminoethyloxy)-phenyl]-1-phenyl-ethanol of the formula

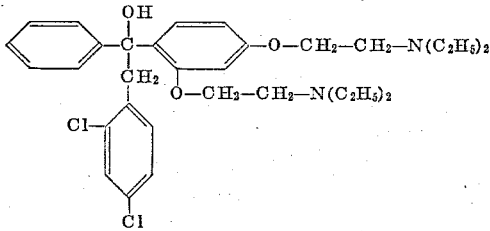

which, when recrystallized from a mixture of ethanol and water, melts at 100.5–101°.

Example 15

A mixture of 7.1 g. of 2-(2,4-dichloro-phenyl)-1-[2,4-di - (2 - N,N-diethylaminoethyloxy)-phenyl]-1-phenylethanol and 100 ml. of concentrated hydrochloric acid is refluxed for thirty minutes. After being diluted with water and adjusted to pH 8 with ammonium hydroxide, the organic material is extracted with diethyl ether; the organic solution is swirled with sodium chloride, dried over sodium sulfate and evaporated. The residue is treated with a solution of hydrogen chloride in diethyl ether to yield the 2-(2,4-dichloro-phenyl)-1-[2,4-di-(2-N, N-diethylaminoethyloxy)-phenyl]-1-phenyl-ethene dihydrochloride of the formula

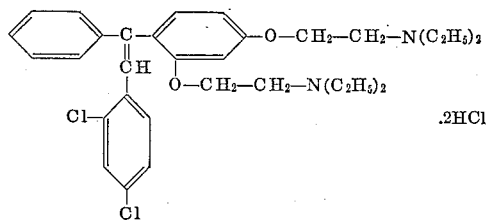

which is obtained by evaporating the solvent.

Example 16

To a Grignard reagent (prepared from 0.87 g. of magnesium in diethyl ether and 7.12 g. of 3,4-dichloro-benzyl chloride in 50 ml. of diethyl ether as described in Example 1) is added while cooling and stirring, 5.0 g. of 2,4-di-(2-N,N-diethylaminoethyloxy)-benzophenone in 25 ml. of diethyl ether. After refluxing for five hours, the reaction mixture is decomposed with a saturated aqueous solution of ammonium chloride and worked up as described in Example 1 to yield 6.7 g. of a viscous oil, which is dissolved in a 1:1-mixture of benzene and hexane and chromatographed on 200 g. of aluminum oxide containing 5 percent of water taking fractions of 50 ml. each:

| Solvent | Amount, ml. | Fractions |
| --- | --- | --- |
| 1=1-mixture of benzene and hexane | 200 | 1 to 6 |
| Benzene | 500 | 7 to 16 |
| Benzene containing 20 percent of diethyl ether | 150 | 17 to 19 |
| Benzene containing 50 percent of diethyl ether | 250 | 20 to 24 |
| Ethyl acetate | 50 | 25 |

Fractions 8, 9 and 10 yield the desired 2-(3,4-dichlorophenyl) - 1-[2,4-di-(2-N,N-diethylaminoethyloxy)-phenyl-1-phenyl-ethanol of the formula

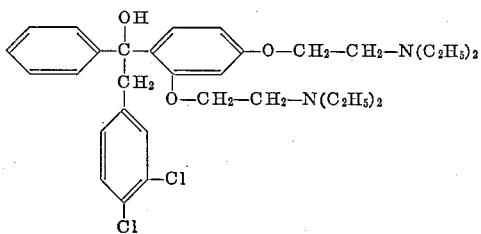

as an orange oil; yield: 4.3 g. It analyzes as follows:
Calcd. for $C_{32}H_{42}Cl_2N_2O_3$: C, 67.01; H, 7.38; N, 4.88.
Found: C, 67.16; H, 7.28; N, 4.92.

Example 17

A suspension of 0.7 g. of 2-(3,4-dichloro-phenyl)-1-[2,4 - di-(2-N,N-diethylaminoethyloxy)-phenyl]-1-phenyl-ethanol in ethanol, when refluxed with hydrogen chloride in ethanol, yields the 2-(3,4-dichloro-phenyl)-1-[2,4-di - (2-N,N-diethylaminoethyloxy)-phenyl]-1-phenyl-ethene of the formula

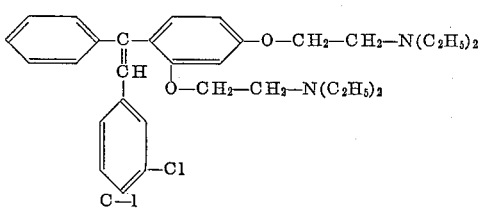

which is obtained by working up the reaction mixture according to the procedure described in Example 2.

Example 18

The Grignard reaction is carried out in a cyclic reactor described in Lawesson, Acta Chem. Scand., vol. 12, p. 1 (1958), using 1.84 g. of 4-methoxy-benzyl chloride, 4.0 g. of the 2,4-di-(2-N,N-diethylaminoethyloxy)-benzophenone and 50 ml. of diethyl ether and a column of magnesium turnings activated with mercuric chloride. After the addition of the Grignard reagent is completed, the reaction mixture is refluxed for two hours, then allowed to stand at room temperature for twenty hours and decomposed with an aqueous ammonium chloride solution. The organic material is extracted with two portions of diethyl ether and two portions of chloroform; the combined organic solutions are washed with a saturated aqueous solution of sodium chloride, dried over sodium sulfate and evaporated to dryness. The desired 1 - [2,4 - di - (2 - N,N - diethylaminoethyloxy) - phenyl]-2-(4-methoxy-phenyl)-1-phenyl-ethanol of the formula

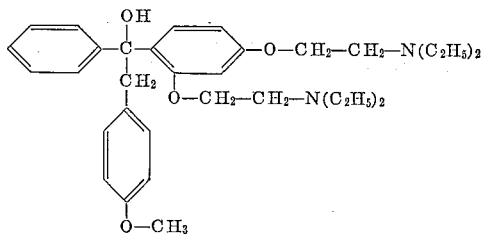

(yield: 3.7 g.) is purified by twice recrystallizing the resulting product from a mixture of ethanol and water, M.P. 121–123°.

Example 18a

A mixture of 1.3 g. of 1-[2,4-di-(2-N,N-diethylaminoethyloxy) - phenyl] - 2 - (4 - methoxy - phenyl) - 1-phenyl-ethanol and ethanol is treated for several minutes with gaseous hydrogen chloride and is then refluxed for three hours. The reaction mixture is worked up as described in Example 2 to yield the 1-[2,4-di-(2-N,N-diethylaminoethyloxy) - phenyl] - 2 - (4 - methoxyphenyl)-1-phenyl-ethene of the formula

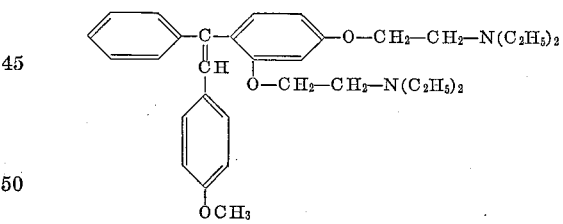

Example 19

To a Grignard reagent prepared from 2.61 g. of magnesium and 21.4 g. of 3,4-dichloro-benzyl chloride in 120 ml. of diethyl ether is added dropwise a solution of 19.3 g. of 2,4-di-(2-N,N-diethylaminoethyloxy)-4'-isopropyl-benzophenone (prepared according to the procedure described in Example 1 by reacting the sodium salt of 2,4-dihydroxy-4'-isopropyl-benzophenone, B.P. 180°/0.1 m.m., with 2-N,N-diethylaminoethyl chloride and purifying the desired starting material by eluting it with a 1:1-mixture of hexane and benzene, and with benzene from a column containing neutral aluminum oxide, activity III) in 75 ml. of diethyl ether. The reaction mixture is refluxed for five hours, decomposed with ice-cold hydrochloric acid, and made basic with ammonium hydroxide. The organic material is extracted with diethyl ether, from which the basic portion is extracted with 2 N hydrochloric acid. The acidic extracts are made basic with sodium carbonate, and the organic material is extracted with diethyl ether; the organic solution yields 16.5 g. of a brown oil, of which 6.0 g. are chromatographed on 250 g. of neutral aluminum oxide, activity III. The desired 2 - (3,4 - dichloro - phenyl) - 1 - [3,4 - di - (2-

N,N - diethylaminoethyloxy) - phenyl] - 1 - (4 - isopropyl-phenyl)-ethanol of the formula

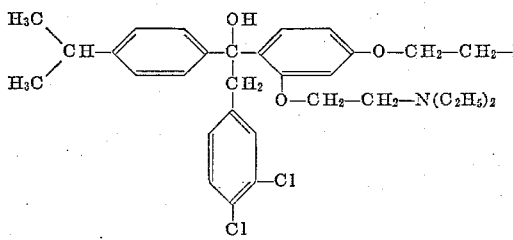

is eluted with a 1:1-mixture of benzene and hexane, and benzene, and crystallized from hexane, M.P. 90–92°.

*Example 20*

A mixture of 1.0 g. of 2-(3,4-dichloro-phenyl)-1-[2,4-di - (2 - N,N - diethylaminoethyloxy) - phenyl] - 1 - (4-isopropyl-phenyl)-ethanol and ethanol is treated with gaseous hydrogen chloride; after refluxing for three hours, the desired 2 - (3,4 - dichloro - phenyl) - 1 - [2,4 - di - (2 - N,N - diethylaminoethyloxy) - phenyl] - 1 - (4-isopropyl-phenyl)-ethene of the formula

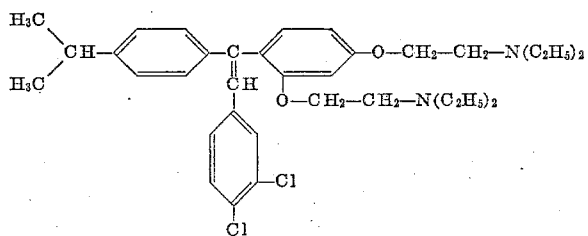

is obtained by working up the reaction mixture as described in Example 2.

*Example 21*

To a stirred mixture of 10.44 g. of magnesium and 480 ml. of diethyl ether is added slowly 85.6 g. of 3,4-dichloro-benzyl chloride in 600 ml. of diethyl ether while maintaining refluxing conditions; the reaction is initiated with a few drops of methyl iodide. Refluxing is continued for 1½ hours, and, after cooling, 77.2 g. of 2,4-di-(2-N,N-diethylaminoethyloxy)-4'-isopropyl-benzophenone in 300 ml. of diethyl ether is added in a slow stream. The orange mixture is refluxed for three hours and poured onto a mixture of ice and ammonium hydroxide. The aqueous layer is washed with diethyl ether, and the combined organic solutions containing the 2-(3,4-dichloro - phenyl) - 1 - [3,4 - di - (2 - N,N - diethyl aminoethyloxy) - phenyl] - 1 - (4 - isopropyl - phenyl) - ethanol are extracted with 2 N hydrochloric acid and washed with water. The combined extracts and washings are made alkaline (pH ~8) with concentrated ammonium hydroxide and extracted with diethyl ether. The organic extracts are swirled with sodium chloride, decanted, dried over sodium sulfate and evaporated under reduced pressure to yield an oily residue (yield: 99.0 g.) which represents the 2 -(3,4 - di - chloro - phenyl) - 1 - [2,4-di - (2 - N,N - diethylaminoethyloxy) - phenyl] - 1 - (4-isopropyl - phenyl) - ethene. Its infrared absorption spectrum shows the absence of any hydroxyl or oxo bands, and the product, when chromatographed on aluminum oxide, is eluted with a 1:1 mixture of benzene and hexane.

*Example 22*

A mixture of 1.91 g. of the 1-(4-biphenylyl)-2-(4-chloro - phenyl) - 1 - [2,4 - (2 - N,N - diethylaminoethyloxy)-phenyl]-ethene dihydrochloride in 15 ml. of chloroform and 0.453 g. of N-chlorosuccinimide is refluxed for eighteen hours and is then evaporated to dryness. The residue is partitioned between diethyl ether and 2 N aqueous sodium carbonate; the resulting layers are separated, and the aqueous layer is extracted with diethyl ether. The combined organic solutions are washed with dilute aqueous sodium hydroxide and water, swirled with sodium chloride, decanted, dried over sodium sulfate, and evaporated under reduced pressure. The resulting turbid oil (yield: 1.8 g.) is dissolved in ethyl methyl ketone and added to a hot solution of 1.0 g. of citric acid in ethyl methyl ketone. The resulting sticky oil crystallizes on cooling to yield the 1-(4-biphenylyl)-2-chloro-2-(4 - chloro - phenyl) - 1 - [2,4 - di - (2 - N,N - diethylaminoethyloxy)-phenyl]-ethene dicitrate of the formula

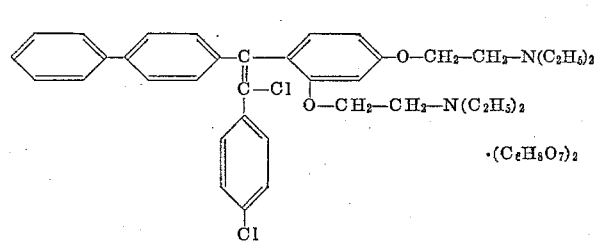

which melts at 148.5–150° after recrystallization from a mixture of ethanol and diethyl ether.

*Example 23*

A mixture of 7.1 g. of 2-(2,4-dichloro-phenyl)-1-[2,4-di - (2 - N,N - diethylaminoethyloxy) - phenyl] - 1-phenyl-ethanol and 100 ml. of concentrated hydrochloric acid is refluxed on the steam bath for thirty minutes. The resulting light orange solution is diluted with water and its pH is adjusted to 8 with ammonium hydroxide. The organic material is extracted with diethyl ether; the organic solutions are swirled with sodium chloride, decanted, dried over sodium sulfate and evaporated. The resulting 2 - (2,4 - dichloro-phenyl)-1-[2,4 - di-(2-N,N-diethylaminoethyloxy)-phenyl]-1-phenyl-ethene is treated with a solution of hydrogen chloride in diethyl ether; the viscous salt with hydrochloric acid is dissolved in 68 ml. of chloroform and refluxed in the presence of 2.12 g. of N-chloro-succinimide for eighteen hours. The reaction mixture is evaporated to dryness, and the residue is taken up into water; the pH is adjusted to 8 with 2 N sodium carbonate and the organic material is extracted with diethyl ether. The organic solution is swirled with sodium chloride, decanted, dried over sodium sulfate and evaporated to dryness to yield 6.0 g. of a dark oil, which is dissolved in ethyl methyl ketone and added to a solution of 5.4 g. of citric acid in boiling ethyl methyl ketone. Upon cooling the sticky mass solidifies to yield the 2-chloro - 2 - (2,4 - dichlorophenyl) - 1 - [2,4-di-(2-N,N-diethylaminoethyloxy) - phenyl] - 1-phenyl - ethene dicitrate of the formula

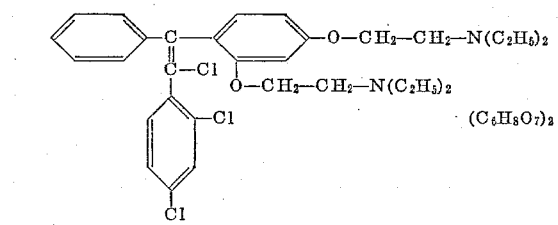

which melts at 109–110° after recrystallization from acetone.

*Example 24*

A solution of 7.3 g. of the 2-(3,4-dichloro-phenyl)-1-[2,4 - di - (2 - N,N - diethylaminoethyloxy) - phenyl]-1-(4-isoproplyphenyl)-ethene dihydrochloride (prepared by treating the free base with a diethyl ether solution of hydrogen chloride and evaporating the solvent) in 50 ml. of chloroform is refluxed in the presence of 1.6 g. of N-chloro-succinimide for eighteen hours, and is then evaporated to dryness. The residue is taken up into water, the pH is adjusted to 8 with a 2 N aqueous sodium carbonate solution, and is then extracted with diethyl ether. The organic solution is washed with 2 N aqueous sodium hydroxide and water, and swirled with sodium chloride, decanted, dried over sodium sulfate and evaporated under reduced pressure. The oily residue is dissolved in 25 ml. of ethyl methyl ketone and added to a solution of 4.0 g. of anhydrous citric acid in 35 ml. of ethyl methyl ketone. The hygroscopic product is recrystallized from a mixture of ethanol and diethyl ether, and the resulting 2 - chloro - 2 - (3,4 - dichloro - phenyl) - 1 - [2,4 - di - (2-N,N - diethylaminoethyloxy) - phenyl] - 1 - (4 - isopropyl-phenyl)-ethene dicitrate of the formula

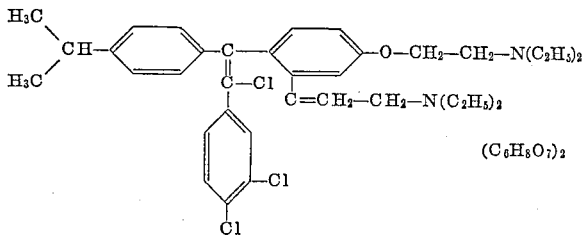

taken up in ethyl methyl ketone, and decanted from the oily portion; it precipitates on cooling and melts at 108–110°.

*Example 25*

To a solution of 8.34 g. of the crude 2-(3,4-dichlorophenyl)-1-(4-isopropyl-phenyl) - 1 - (2,3,4-trihydroxyphenyl)-ethane in 40 ml. of N,N-dimethylformamide is added in portions while stirring and cooling in an ice bath, a total of 2.88 g. of a 53 percent suspension of sodium hydride in mineral oil. After the evolution of hydrogen ceases, 8.13 g. of 2-N,N-diethylaminoethyl chloride (37.6 ml. of a toluene solution containing 0.216 g./ml. of the base) is added while cooling, and the reaction mixture is stirred at room temperature and allowed to stand overnight. The solvent is evaporated to dryness, water is added to the residue, and the pH is adjusted to about 9 with ascetic acid. The basic material is extracted with diethyl ether; the organic solution is in turn extracted with 2 N hydrochloric acid, and the aqueous extract is adjusted to pH 8 with ammonium hydroxide. The organic material is extracted with diethyl ether, and the organic solution is swirled with sodium chloride, decanted, dried over sodium sulfate and evaporated to dryness. The gummy residue (yield: 10.7 g.) is chromatographed on 330 g. of neutral aluminum oxide (activity III), and the desired oily 2-(3,4-dichlorophenyl)-1-(4-isopropyl-phenyl)-1-[2,3,4-(tri- 2-N,N-diethylaminoethyloxy)-phenyl]-ethane of the formula

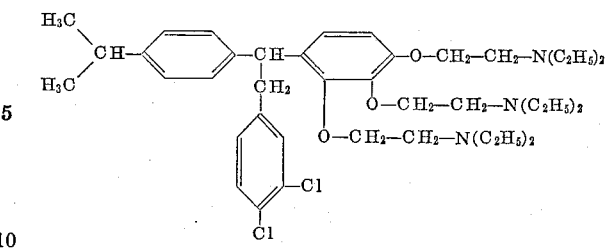

is eluted with a 5:1 mixture of benzene and diethyl ether. Its picrate is prepared by reacting the free base with picric acid.

The starting material used in the above procedure is prepared as follows: A mixture of 5.5 g. of magnesium in 240 ml. of diethyl ether is reacted with 43.0 g. of 3,4-dichloro-benzyl chloride in 300 ml. of diethyl ether; the reaction is initiated by gently refluxing. After one hour of refluxing, the Grignard preparation is cooled in an ice-bath and 29.6 g. of 4-isopropyl-benzaldehyde in 150 ml. of diethyl ether is added in a slow stream. The yellow reaction mixture is refluxed for five hours and is then decomposed on ice and a saturated ammonium chloride solution. The organic material is extracted with diethyl ether; the organic solution is swirled with sodium chloride, decanted, dried over sodium sulfate and evaporated under reduced pressure. The resulting orange oil is distilled to yield 31.5 g. of 1-(4-isopropyl-phenyl)-2-(3,4-dichloro-phenyl)-ethanol, which is collected at 160–190°/0.05 mm.

To 30 ml. of glacial acetic acid is added dropwise 1,2 ml. of concentrated sulfuric acid while stirring in an ice bath; the mixture is treated with 12.6 g. of pyrogallol and then dropwise with 30.9 g. of 1-(4-isopropyl-phenyl)-2-(3,4-dichloro-phenyl)-ethanol in 45 ml. of acetic acid while keeping the temperature below 15°. Stirring is continued for one hour at room temperature, and after standing overnight, the reaction mixture is poured onto ice and adjusted to pH 5 with aqueous sodium hydroxide. The organic material is extracted with diethyl ether; the organic solution is washed with a dilute sodium hydrogen carbonate solution in water until neutral, and is then swirled with sodium chloride, decanted, dried over sodium sulfate and evaporated under reduced pressure. The resulting 2-(3,4-dichloro-phenyl)-1-(4-isopropyl-phenyl)-1-(2,3,4-trihydroxy-phenyl)-ethane is used without further purification.

*Example 26*

Other compounds of this invention prepared according to any of the previously-described and illustrated procedures by selecting the appropriate starting materials are, for example,

| Starting Material | Reagent | Product |
|---|---|---|
| 2,4-di-(2-N,N-dimethylaminotehyloxy)-4'-methyl-benzophenone. | p-Chloro-phenyl-1-ethyl lithium. | 2-(4-chloro-phenyl)-1-[2,4-di-(2-N,N-dimethylaminoethyloxy)-phenyl]-2-methyl-2-(4-methyl-phenyl)-ethanol. |
| 4'-bromo-3,4-di-(2-N,N-di-isopropylaminoethyloxy)-benzophenone. | 4-methoxy-benzyl magnesium chloride. | 1-(4-bromo-phenyl)-1-[3,4-di-(2-N,N-di-isopropylaminoethyloxy)-phenyl]-2-(4-methoxy-phenyl)-ethanol. |
| 2,4-di-[2-(4-morpholino)-ethyloxy]-benzophenone. | 4-chloro-benzyl magnesium chloride. | 2-(4-chloro-phenyl)-1-{2,4-di-[2-(4-morpholino)-ethyloxy]-phenyl}-1-phenylethanol. |
| 4'-(4-methyl-phenyl)-2,4-di-[2-(4-methyl-1-piperazino)-ethyloxy]-benzophenone. | 4-trifluoromethyl-benzyl magnesium chloride. | 1-(4'-methyl-biphenylyl)-1-{-2,4-di-[2-(4-methyl-1-piperazino)-ethyloxy]-phenyl}2-(4-trifluoromethyl-phenyl)-ethanol. |
| 2,4-di-(3-N,N-diethylaminopropyloxy)-benzophenone. | 4-fluoro-benzyl magnesium chloride. | 1-[2,4-di-(3-N,N-diethylaminopropyloxy)-phenyl]-2-(4-fluoro-phenyl)-1-phenyl-ethanol. |
| 2,4-di-[2-(1-pyrrolidino)-ethyloxy]-benzophenone. | 4-chloro-benzyl magnesium chloride. | 2-(4-chloro-phenyl)-1-phenyl-1-{2,4-di-[2-(1-pyrrolidino)-ethyloxy]-phenyl}-ethanol. |
| 2-(4-chloro-phenyl)-1-[2,4-di-(2-N,N-dimethylaminoethyloxy)-phenyl]-2-methyl-2-(4-methyl-phenyl)-ethanol. | Hydrogen chloride in ethanol. | 2-(4-chloro-phenyl)-1-[2,4-di-(2-N,N-dimethylaminoethyloxy)-phenyl]-2-methyl-2-(4-methyl-phenyl)-ethene. |
| 1-(4-bromo-phenyl)-1-[3,4-di-(2-N,N-di-isopropylaminoethyloxy)-phenyl]-2-(4-methoxy-phenyl)-ethanol. | do | 1-(4-bromo-phenyl)-1-[3,4-di-(2-N,N-di-isopropylaminoethyloxy)-phenyl]-2-(4-methoxy-phenyl)-ethene. |
| 2-(4-chloro-phenyl)-1-{2,4-di-[2-(4-morpholino)-ethyloxy]-phenyl}-1-phenyl-ethanol. | do | 2-(4-chloro-phenyl)-1-{2,4-di-[2-(4-morpholino)-ethyloxy]-phenyl}-1-phenyl-ethene. |
| 1-(4'-methyl-biphenylyl)-1-{2,4-di-[2-(4-methyl-1-piperazino)-ethyloxy]-phenyl}-2-(4-trifluoromethylphenyl)-ethanol. | do | 1-(4'-methyl-biphenylyl)-1-{2,4-di-[2-(4-methyl-1-piperazino)-ethyloxy]-phenyl}-2-(4-trifluoromethyl-phenyl)-ethene. |

| Starting Material | Reagent | Product |
|---|---|---|
| 1-[2,4-di-(3-N,N-diethylaminopropyloxy)-phenyl]-2-(4-fluoro-phenyl)-1-phenyl-ethanol. | ___do___ | 1-[2,4-di-(3-N,N-diethylaminopropyloxy)-phenyl]-2-(4-fluoro-phenyl)-1-phenyl-ethene. |
| 2-(4-chloro-phenyl)-1-phenyl-1-{2,4-di-[2-(1-pyrrolidino)-ethyloxy]-phenyl-}ethanol. | ___do___ | 2-(4-chlor-phenyl)-1-phenyl-1-{2,4-di-[2-(1-pyrrolidino)-ethyloxy]-phenyl}-ethene. |
| 2-(4-chloro-phenyl)-1-(2,4-dihydroxyphenyl)-1-(4-methylphenyl)-ethane. | NaH+2-N,N-diethylaminoethyl chloride. | 2-(4-chloro-phenyl)-1-[2,4-di-(2-N,N-diethylaminoethyloxy)-phenyl]-1-(4-methylphenyl)-ethane. |
| 1-(2,4-dihydroxyphenyl)-1-(4-fluorophenyl)-2-(4-methoxy-phenyl)-ethane. | NaH+1-(2-chloroethyl)-piperidine. | 1-(4-fluoro-phenyl)-2-(4-methoxy-phenyl)-1-{2,4-di-[2-(1-piperidino)-ethyloxy]-phenyl}-ethane. |
| 1-biphenylyl-1-(2,4-dihydroxy-phenyl)-2-(4-methyl-phenyl)-ethane. | NaH+3-N,N-dimethylaminopropylchloride. | 1-biphenylyl-1-[2,4-di-(3-N,N-dimethylaminopropyloxy)-phenyl]-2-(4-methyl-phenyl)-ethane. |
| 1-(2,4-dihydroxyphenyl)-1-(4'-methyl-biphenylyl)-2-phenyl-ethane. | NaH+1-(2-chloroethyl)-pyrrolidine. | 1-(4'-methyl-biphenylyl)-2-phenyl-1-{2,4-di-[2-(1-pyrrolidino)-ethyloxy]-phenyl}-ethane. |
| 1,2-diphenyl-1-(3,4-dihydroxy-phenyl)-2-methyl-ethane. | NaH+1-(2-chloroethyl)-4-methyl-piperazine. | 1,2-diphenyl-2-methyl-1-{3,4-di-[2-(4-methyl-1-piperazino)-ethyloxy]-phenyl}-ethane. |
| 2-(4-chloro-phenyl)-1-(2,4-dihydroxyphenyl)-1-phenyl-ethane. | NaH+4(2-chloroethyl)-morpholine. | 2-(4-chloro-phenyl)-1-{2,4-di-(2-(4-morpholino)-ethyloxy]-phenyl}-1-phenyl-ethane. |

What is claimed is:
1. A member selected from the group consisting of a compound of the formula

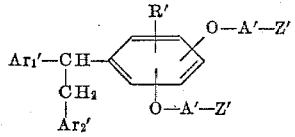

in which each of the groups $Ar_1'$ and $Ar_2'$ is a member selected from the group consisting of phenyl, (lower alkyl)-phenyl, (lower alkoxy)-phenyl, (halogeno)-phenyl, (halogeno-lower alkyl)-phenyl, biphenylyl, (lower alkyl)-biphenylyl, (lower alkoxy)-biphenylyl, (halogeno)-biphenylyl and (halogeno-lower alkyl)-biphenylyl, $Z'$ is a member selected from the group consisting of N,N-di-lower alkyl-amino N-lower alkyl-N-phenyl lower alkyl, N-lower alkyl-N-cyclo-lower alkyl and N,N-alkyleneimino, in which alkylene has from four to six carbon atoms, $A'$ is lower alkylene having from two to three carbon atoms and separating $Z'$ from oxygen by at least two carbon atoms, and $R'$ is a member selected from the group consisting of hydrogen, lower alkyl, halogeno and the group of the formula —O—A'—Z', in which $Z'$ and $A'$ have the previously-given meaning, and acid addition salts thereof N-oxides thereof, acid addition salts of N-oxides thereof and quaternary ammonium salts thereof.

2. 2-(3,4-dichloro-phenyl)-1-(4 - isopropyl-phenyl)-1-[2,3,4-tri-(2-N,N-diethylaminoethyloxy)-phenyl]-ethane.

3. A member selected from the group consisting of a compound of the formula

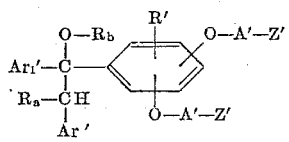

in which each of the groups $Ar_1'$ and $Ar_2'$ is a member selected from the group consisting of phenyl, (lower alkyl)-phenyl, (lower alkoxy)-phenyl, (halogeno)-phenyl, (halogeno-lower alkyl)-phenyl, biphenylyl, (lower alkyl)-biphenylyl, (lower alkoxy)-biphenylyl, (halogeno)-biphenylyl and (halogeno-lower alkyl)-biphenylyl, $Z_1$ is a member selected from the group consisting of N,N-di-lower alkyl-amino N-lower alkyl-N-phenyl lower alkyl, N-lower alkyl-N-cyclo-lower alkyl and N,N-alkyleneimino, in which alkylene has from four to six carbon atoms, $A'$ is lower alkylene having from two to three carbon atoms and separating $Z'$ from oxygen by at least two carbon atoms, and $R'$ is a member selected from the group consisting of hydrogen, lower alkyl, halogeno and a group of the formula —O—A'—Z', in which $Z'$ and $A'$ have the previously-given meaning $R_a$ is a member selected from the group consisting of hydrogen and lower alkyl and $R_b$ is a member selected from the group consisting of hydrogen and carboxylic acid acyl, and acid addition salts thereof N-oxides thereof, acid addition salts of N-oxides thereof and quaternary ammonium salts thereof.

4. 2-(4-chloro-phenyl)-1-[2,4-di-(2-N,N-diethylaminoethyloxy)-phenyl]-1-phenyl-ethanol.

5. 2-(4-chloro-phenyl)-1-[2,4-di-(2-N,N-diethylaminoethyloxy)-phenyl]-1-(4-methyl-phenyl)-ethanol.

6. 1-(4-biphenylyl)-2-(4 - chloro-phenyl)-1-[2,4-di-(2-N,N-diethylaminoethyloxy)-phenyl]-ethanol.

7. 2-(4-chloro-phenyl)-1-phenyl-1-{2,4 - di[2-(1-piperidino)-ethyloxy]-phenyl}-ethanol.

8. 2-(4 - chloro-phenyl)-1 - phenyl-1-[2,3,4-tri-(2-N,N-diethylaminoethyloxy)-phenyl]-ethanol.

9. 2-(2,4 - dichloro-phenyl)-1-[2,4-di-(2 - N,N-diethylaminoethyloxy)-phenyl]-1-phenyl-ethanol.

10. 2-(3,4 - dichloro-phenyl)-1-[2,4-di-(2-N,N-diethylaminoethyloxy)-phenyl]-1-phenyl-ethanol.

11. 1-[2,4-di-(2-N,N - diethylaminoethyloxy)-phenyl]-2-(4-methoxy-phenyl)-1-phenyl-ethanol.

12. 2-(3,4-dichloro-phenyl)-1-[2,4-di-(2 - N,N-diethylaminoethyloxy)-phenyl]-1-(4-isopropyl-phenyl)-ethanol.

13. A member selected from the group consisting of a compound of the formula

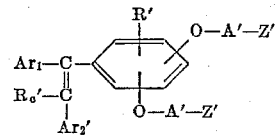

in which each of the groups $Ar_1'$ and $Ar_2'$ is a member selected from the group consisting of phenyl, (lower alkyl)-phenyl, (lower alkoxy)-phenyl, (halogeno)-phenyl, (halogeno-lower alkyl)-phenyl, biphenylyl, (lower alkyl) - biphenylyl, (lower alkoxy) - biphenylyl, (halogeno)-biphenylyl, and (halogeno-lower alkyl)-biphenylyl, $Z'$ is a member selected from the group consisting of N,N-di-lower alkyl-amino N-lower alkyl-N-phenyl lower alkyl, N-lower alkyl-N-cyclo-lower alkyl and N,N-alkylene-imino, in which alkylene has from four to six carbon atoms, $A'$ is lower alkylene having from two to three carbon atoms and separating $Z'$ from oxygen by at least two carbon atoms, $R'$ is a member selected from the group consisting of hydrogen, lower alkyl, halogeno and a group of the formula —O—A'—Z', in which $Z'$ and $A'$ have the previously-given meaning, and $R_c'$ is a member selected from the group consisting of hydrogen, lower alkyl and halogeno, and acid addition salts thereof N-oxides thereof, acid addition salts of N-oxides thereof and quaternary ammonium salts thereof.

14. 2-(4-chloro-phenyl)-1-[2,4-di-(2-N,N - diethylaminoethyloxy)-phenyl]-1-phenyl-ethene.

15. 2-chloro-2-(4 - chloro-phenyl)-1-[2,4-di-(2-N,N-diethylaminoethyloxy)-phenyl]-1-phenyl-ethene.

16. 2-(2-chloro-phenyl)-1-[2,4-di-(2-N,N - diethylaminoethyloxy)-phenyl]-1-phenyl-ethene.

17. 2-(4-chloro-phenyl)-1-[2,4-di-(2-N,N - diethylaminoethyloxy)-phenyl]-1-(4-methyl-phenyl)-ethene.

18. 2-chloro-2-(4 - chloro-phenyl)-1-(4-chloromethyl-phenyl)-1-[2,4-di-(2-N,N-diethylaminoethyloxy) - phenyl]-ethene.

19. 1-(4-biphenylyl)-2-(4 - chloro - phenyl)-1-[2,4-di-(2-N,N-diethylaminoethyloxy)-phenyl]-ethene.

20. 1-(4-biphenylyl)-2-chloro-2-(4-chloro - phenyl)-1-[2,4-di-(2-N,N-diethylaminoethyloxy)-phenyl]-ethene.

21. 2-(4-chloro-phenyl)-1 - phenyl-1-{2,4-di-[2-(1-piperidino)-ethyloxy]-phenyl}-ethene.

22. 2-(2,4-dichloro-phenyl)-1-[2,4-di-(2 - N,N-diethylaminoethyloxy)-phenyl]-1-phenyl-ethene.

23. 2-chloro-2-(2,4-dichloro-phenyl)-1-[2,4-di-(2-N,N-diethylaminoethyloxy)-phenyl]-1-phenyl-ethene.

24. 2-(3,4 - dichloro-phenyl)-1-[2,4-di-(2-N,N-diethylaminoethyloxy)-phenyl]-1-(4-isopropyl-phenyl)-ethene.

25. 2-chloro-2-(3,4-dichloro-phenyl)-1-[2,4-di-(2-N,N-diethylaminoethyloxy)-phenyl]-1-(4-isopropyl - phenyl)-ethene.

References Cited by the Examiner
UNITED STATES PATENTS

| | | | |
|---|---|---|---|
| 2,914,529 | 11/1959 | Allen et al. | 260—247.7 |
| 2,914,564 | 11/1959 | Allen et al. | 260—570 |
| 2,971,001 | 2/1961 | Palopoli et al. | 260—294.7 |
| 3,007,935 | 11/1961 | Bencze | 260—296 |

WALTER A. MODANCE, *Primary Examiner.*

A. D. SPEVACK, *Assistant Examiner.*